(12) United States Patent
Renner et al.

(10) Patent No.: US 10,428,222 B2
(45) Date of Patent: Oct. 1, 2019

(54) SYSTEMS AND METHODS FOR CREATING DURABLE LUBRICIOUS SURFACES VIA INTERFACIAL MODIFICATION

(71) Applicant: LiquiGlide Inc., Cambridge, MA (US)

(72) Inventors: C. Benjamin Renner, Cambridge, MA (US); Bahar M. Alipour, Cambridge, MA (US); Sruti Balasubramanian, Arlington, MA (US); Justin Kleingartner, Cambridge, MA (US); J. David Smith, Arlington, MA (US); Kripa Kiran Varanasi, Lexington, MA (US)

(73) Assignee: LiquiGlide Inc., Cambridge, MA (US)

( * ) Notice: Subject to any disclaimer, the term of this patent is extended or adjusted under 35 U.S.C. 154(b) by 0 days.

(21) Appl. No.: 16/185,613

(22) Filed: Nov. 9, 2018

(65) Prior Publication Data
US 2019/0077967 A1    Mar. 14, 2019

Related U.S. Application Data

(63) Continuation of application No. PCT/US2018/020724, filed on Mar. 2, 2018.
(Continued)

(51) Int. Cl.
*C09D 5/00*    (2006.01)
*C09D 7/40*    (2018.01)
(Continued)

(52) U.S. Cl.
CPC .............. *C09D 5/00* (2013.01); *B05D 5/08* (2013.01); *C09D 5/08* (2013.01); *C09D 5/16* (2013.01);
(Continued)

(58) Field of Classification Search
CPC ... C09D 5/00; C09D 7/69; C09D 7/63; C09D 5/08; C09D 5/16; C09D 7/40; B05D 5/08
See application file for complete search history.

(56) References Cited

U.S. PATENT DOCUMENTS

| 2013/0251952 A1 | 9/2013 | Smith et al. |
| 2014/0147627 A1 | 5/2014 | Aizenberg et al. |

(Continued)

FOREIGN PATENT DOCUMENTS

WO    WO 2016/181676 A1    11/2016

OTHER PUBLICATIONS

US Food & Drug Administration, Published/Archived on Jan. 28, 2016, Food Additive Status List, Retrieved on archive.org on Apr. 3, 2019. (Year: 2016).*

(Continued)

*Primary Examiner* — Nathan L Van Sell
(74) *Attorney, Agent, or Firm* — Cooley LLP

(57) ABSTRACT

Embodiments described herein relate generally to systems and methods for creating durable lubricious surfaces (DLS) via interfacial modification. The DLS can be prepared via a combination of a solid, a liquid, and an additive that modifies the interface between the DLS and a contact liquid, resulting in an interfacial layer that acts as a lubricant and/or protective coating between the DLS and the contact liquid. The lubricating effect created between the additive and the contact liquid results in enhanced slipperiness, as well as the protective properties that can help with durability of the DLS.

94 Claims, 13 Drawing Sheets

Related U.S. Application Data

(60) Provisional application No. 62/466,008, filed on Mar. 2, 2017.

(51) Int. Cl.
    *C09D 7/63*     (2018.01)
    *C09D 5/16*     (2006.01)
    *B05D 5/08*     (2006.01)
    *C09D 5/08*     (2006.01)

(52) U.S. Cl.
    CPC ................. *C09D 7/40* (2018.01); *C09D 7/63* (2018.01); *C09D 7/69* (2018.01)

(56) References Cited

U.S. PATENT DOCUMENTS

| | | | |
|---|---|---|---|
| 2014/0314975 A1* | 10/2014 | Smith | ........................ B05C 7/00 428/34.1 |
| 2014/0314991 A1* | 10/2014 | Smith | ................... A47J 36/025 428/141 |
| 2015/0044420 A1 | 2/2015 | Nowak et al. | |
| 2015/0079315 A1 | 3/2015 | Smith et al. | |
| 2015/0273518 A1 | 10/2015 | Varanasi et al. | |
| 2017/0021385 A1 | 1/2017 | Smith et al. | |

OTHER PUBLICATIONS

Search Report and Written Opinion of International Searching Authority in International Application No. PCT/US2018/020724 dated Apr. 27, 2018, 39 pages.

\* cited by examiner

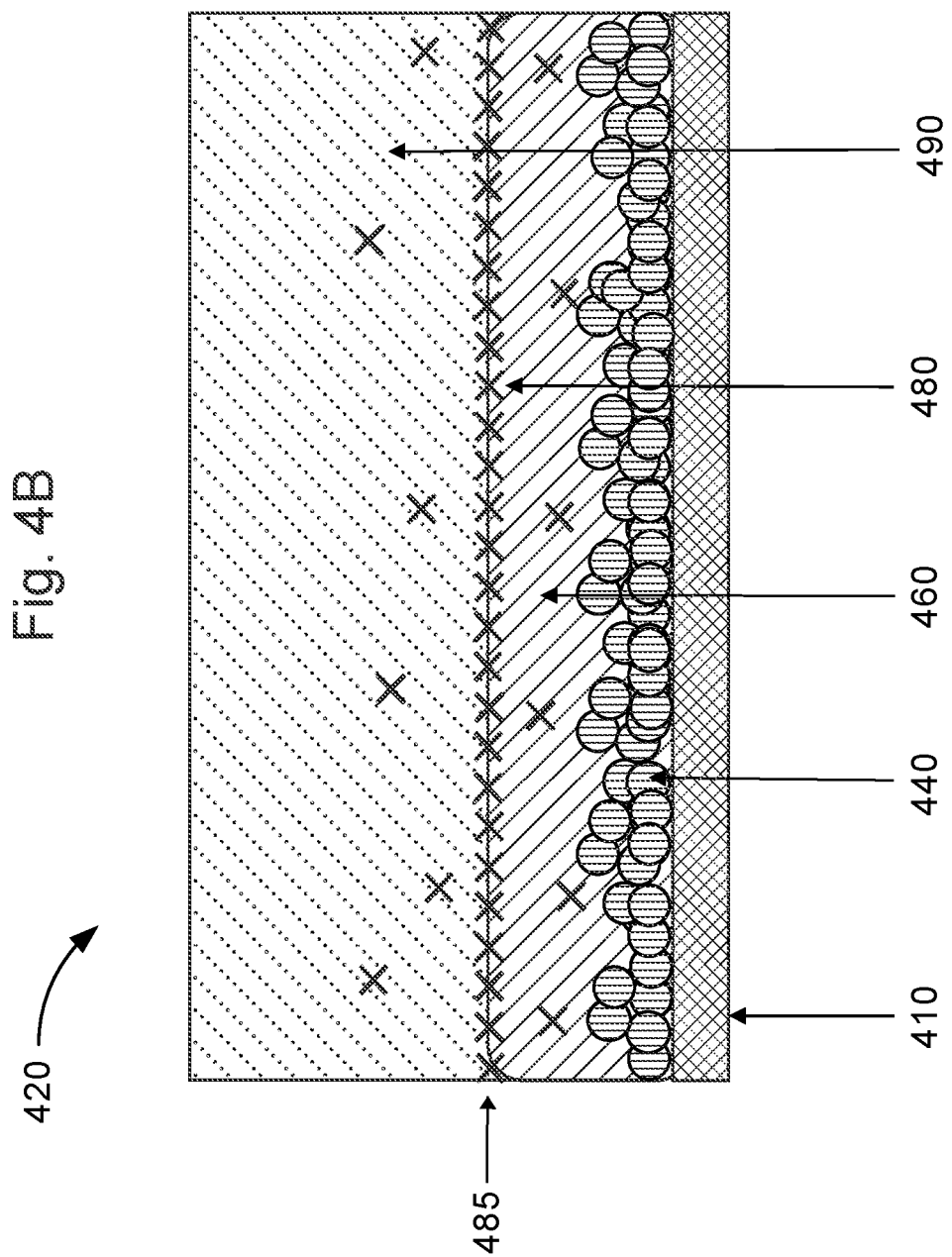

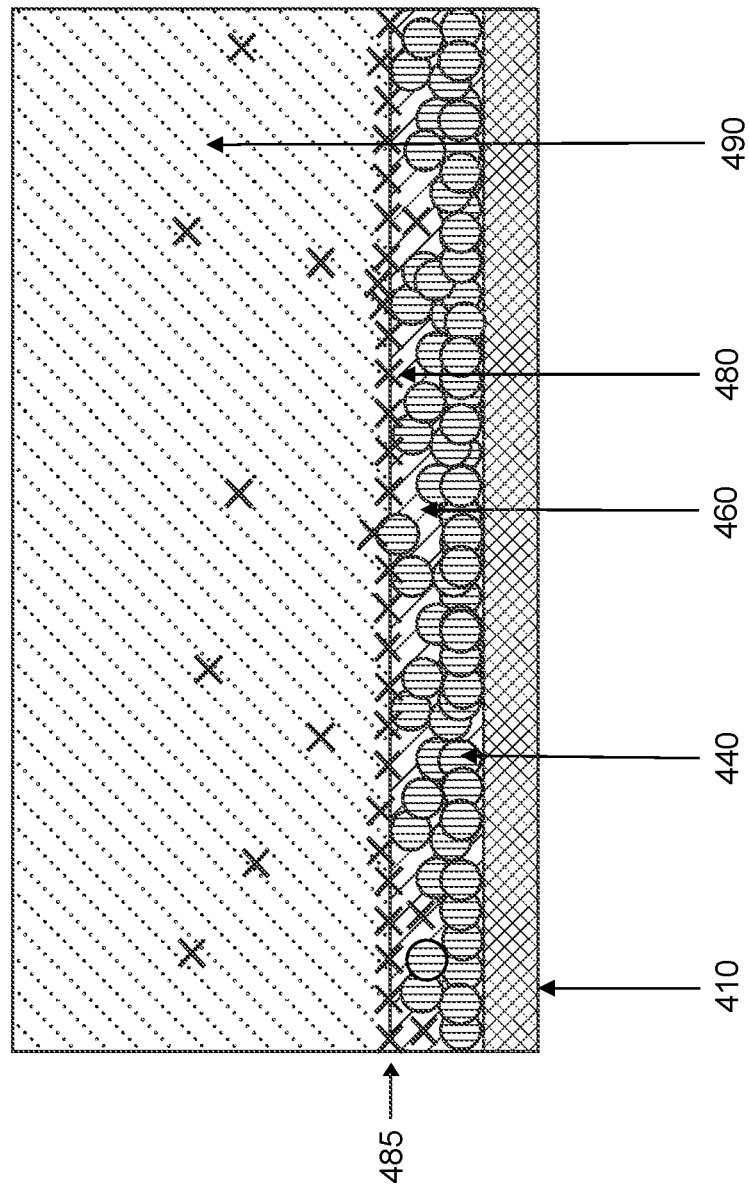

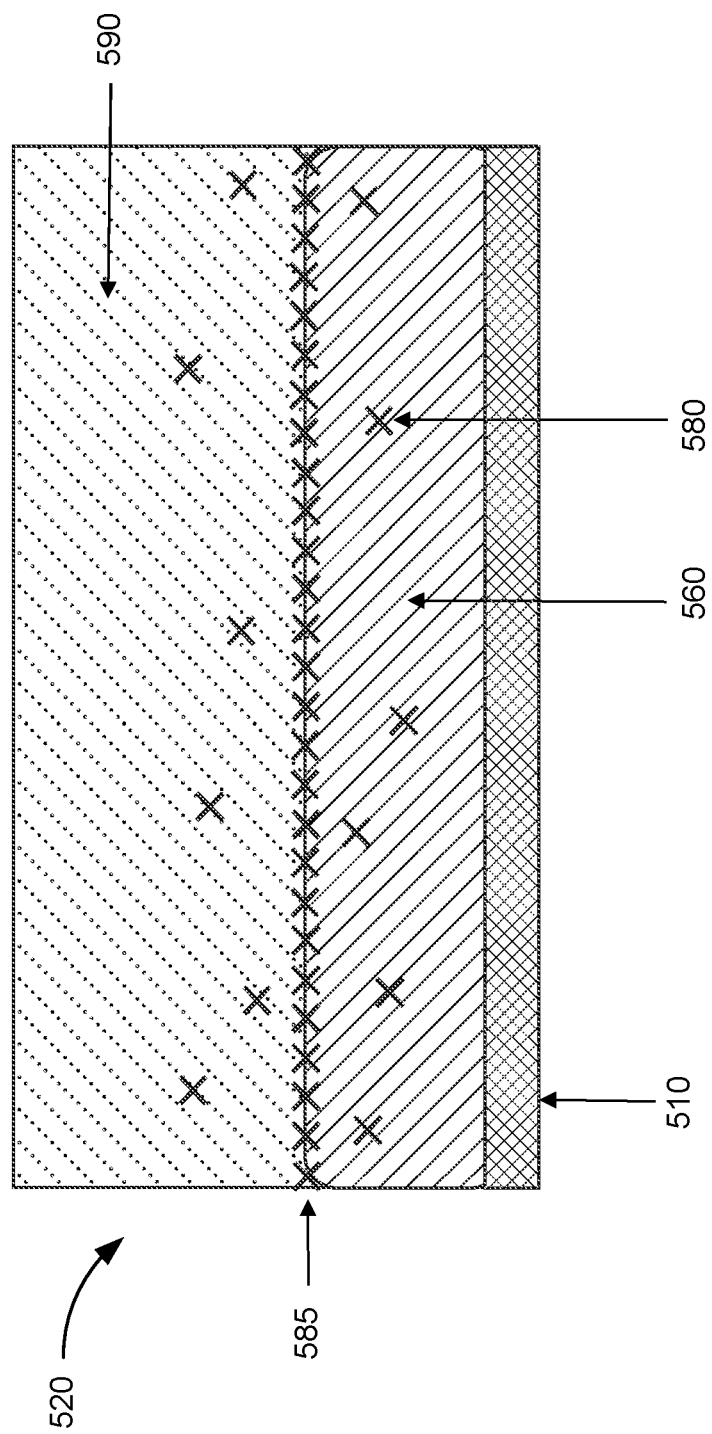

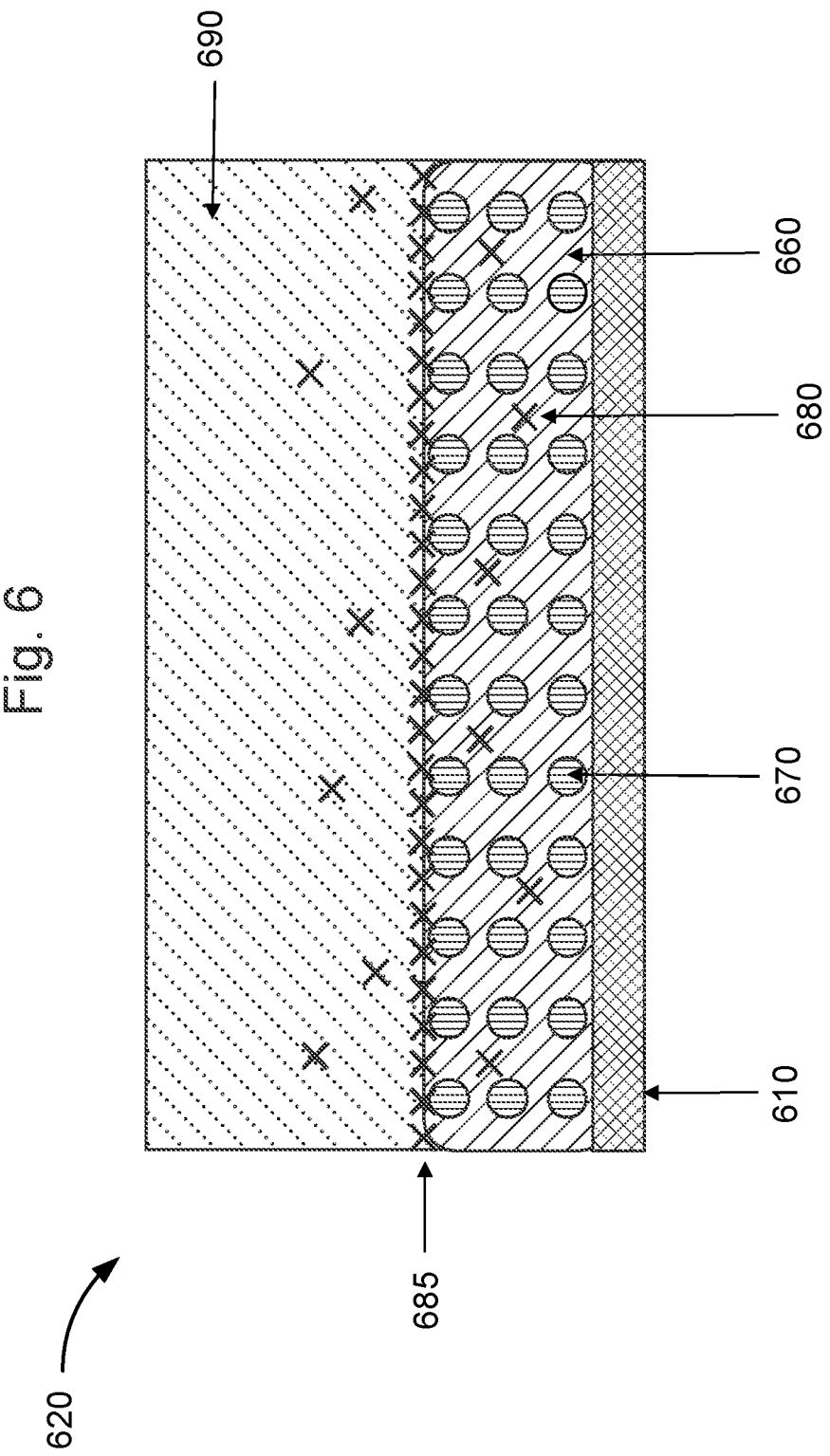

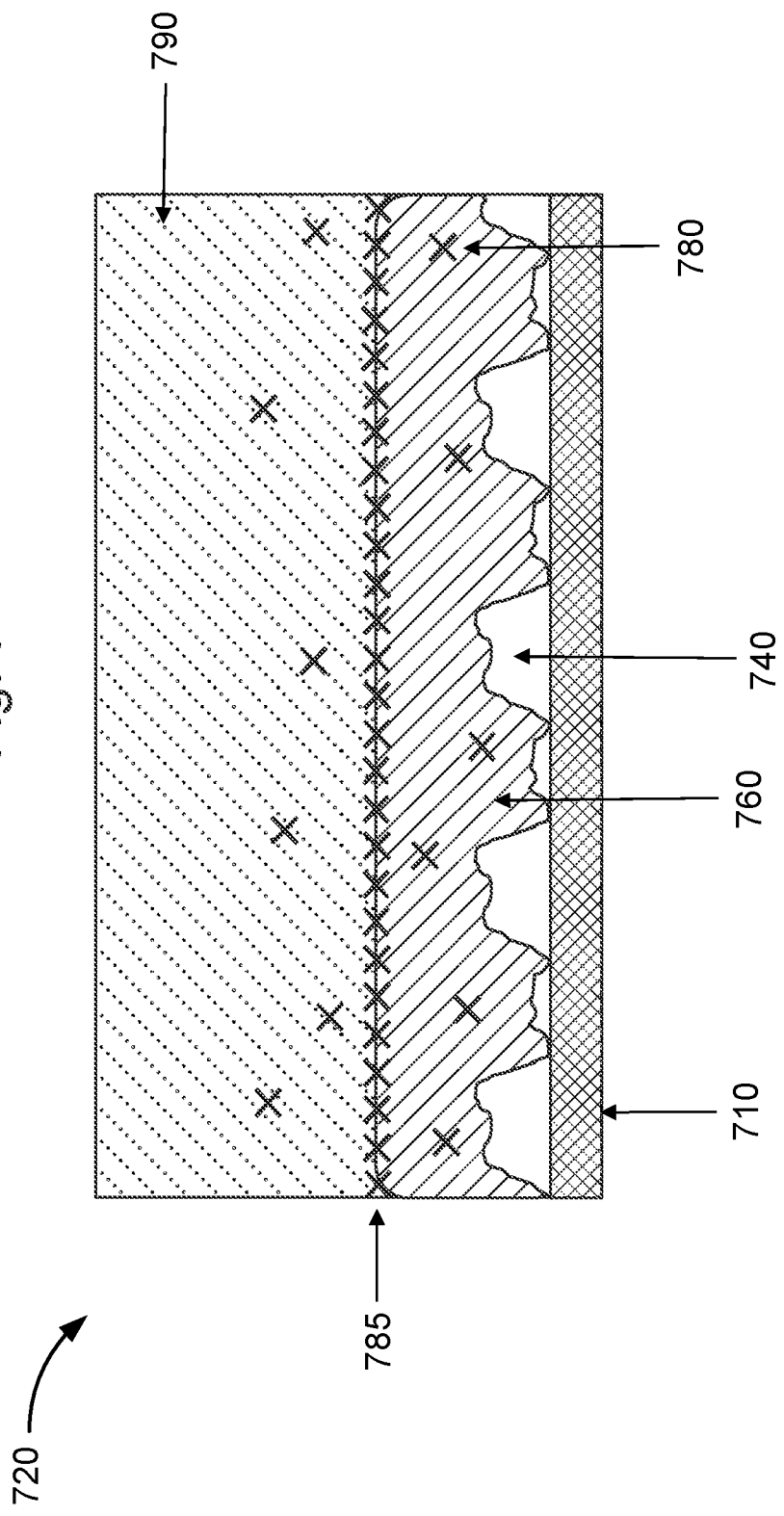

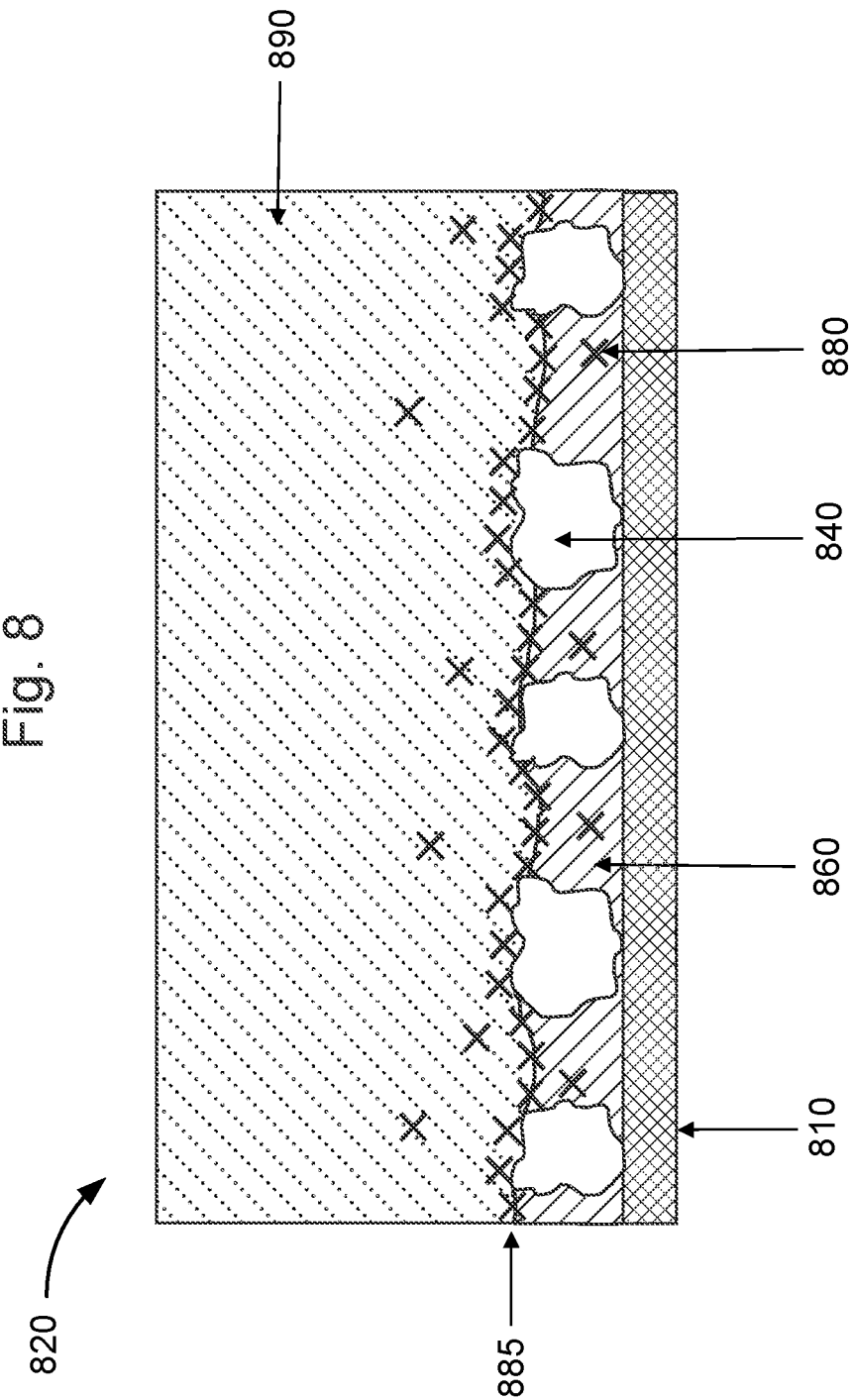

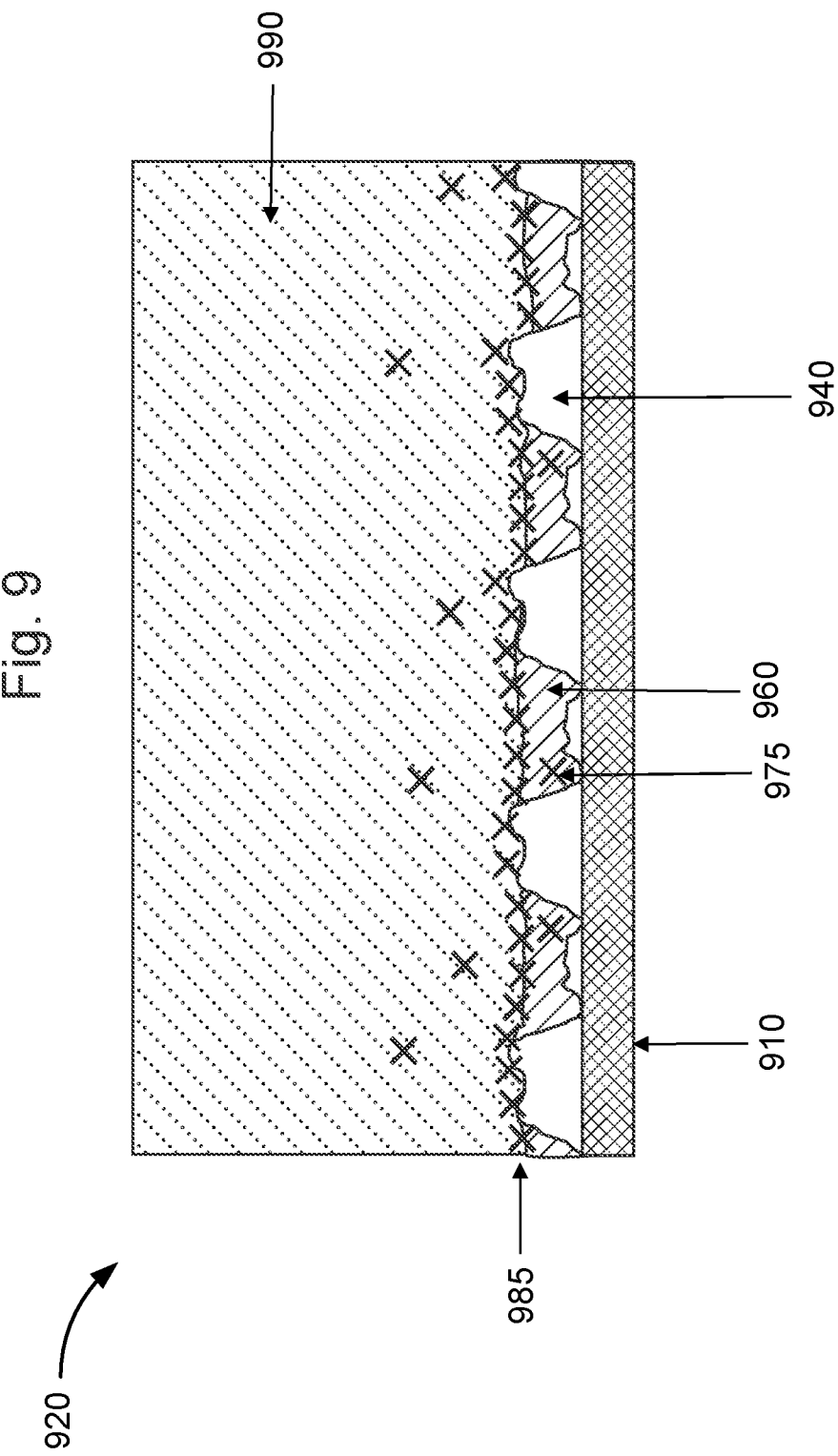

SYSTEMS AND METHODS FOR CREATING DURABLE LUBRICIOUS SURFACES VIA INTERFACIAL MODIFICATION

CROSS-REFERENCE TO RELATED APPLICATIONS

This application is a continuation of International Patent Application No. PCT/US2018/020724, filed Mar. 2, 2018 and titled "SYSTEMS AND METHODS FOR CREATING DURABLE LUBRICIOUS SURFACES VIA INTERFACIAL MODIFICATION," which claims priority to and the benefit of U.S. Provisional Patent Application Ser. No. 62/466,008, filed Mar. 2, 2017 and titled "Systems and Methods for Creating Durable Lubricious Surfaces via Interfacial Modification," the disclosures of which are hereby incorporated by reference in their entireties.

BACKGROUND

The advent of engineered surfaces in the last decade has produced new techniques for enhancing a wide variety of surfaces and interfaces of materials. For example, the use of engineered surface textures in the micro- and nano-scale has provided non-wetting surfaces capable of achieving less viscous drag, reduced adhesion to ice and other materials, self-cleaning, anti-fogging capability, and water repellency. These improvements result generally from reduced interface contact (i.e., less wetting or non-wetting) between the solid surfaces and contacting liquids.

One of the drawbacks of existing non-wetting surfaces (e.g., superhydrophobic, superoleophobic, and supermetallophobic surfaces) is that they are susceptible to impalement, which destroys the non-wetting capabilities of the surface. Impalement occurs when an impinging liquid (e.g., a liquid droplet or liquid stream) displaces the air entrained within the surface textures. Previous efforts to prevent impalement have focused on reducing surface texture dimensions from the micro- to nano-scale. In addition, existing non-wetting surfaces are susceptible to ice formation and adhesion. For example, when frost forms on existing super hydrophobic surfaces, the surfaces become hydrophilic. Under freezing conditions, water droplets can stick to the surface, and ice may accumulate. Removal of the ice can be difficult because the ice may interlock with the textures of the surface. Similarly, when these surfaces are exposed to solutions saturated with salts, for example as in desalination or oil and gas applications, scale builds on surfaces and results in loss of functionality. Similar limitations of existing non-wetting surfaces include problems with hydrate formation, and formation of other organic or inorganic deposits on the surfaces. Thus, there is a need for improved non-wetting surfaces that have enhanced durability and life expectancy.

SUMMARY

Embodiments described herein relate generally to systems and methods for creating durable lubricious surfaces (DLS) via interfacial modification. The DLS can be prepared via a combination of a solid, a liquid, and an additive that modifies the interface between the DLS and a contact liquid, resulting in an interfacial layer that acts as a lubricant and/or protective coating between the DLS and the contact liquid. The lubricating effect created between the additive and the contact liquid results in enhanced slipperiness, as well as the protective properties that can help with durability of the DLS.

BRIEF DESCRIPTION OF THE DRAWINGS

FIG. 4B shows an illustration of a cross-section of the liquid impregnated surface after the additive has migrated to the interface with a contact liquid, according to an embodiment.

FIG. 4C shows an illustration of a cross-section of the liquid impregnated surface after depletion of excess impregnating liquid from the interstitial regions, according to an embodiment.

FIG. 5 shows an illustration of a cross-section of a durable lubricious surface with an interfacial modifier additive, according to an embodiment.

FIG. 6 shows an illustration of a cross-section of a durable lubricious surface with an interfacial modifier additive and a rheological modifier additive, according to an embodiment.

FIG. 7 shows an illustration of a cross-section of a durable lubricious surface comprising a liquid-impregnated surface and an interfacial modifier additive, according to an embodiment.

FIG. 8 shows an illustration of a cross-section of a durable lubricious surface comprising a liquid-impregnated surface and an interfacial modifier additive, according to an embodiment.

FIG. 9 shows an illustration of a cross-section of a durable lubricious surface comprising a liquid-impregnated surface and an interfacial modifier additive, according to an embodiment.

DETAILED DESCRIPTION

Figure 1:
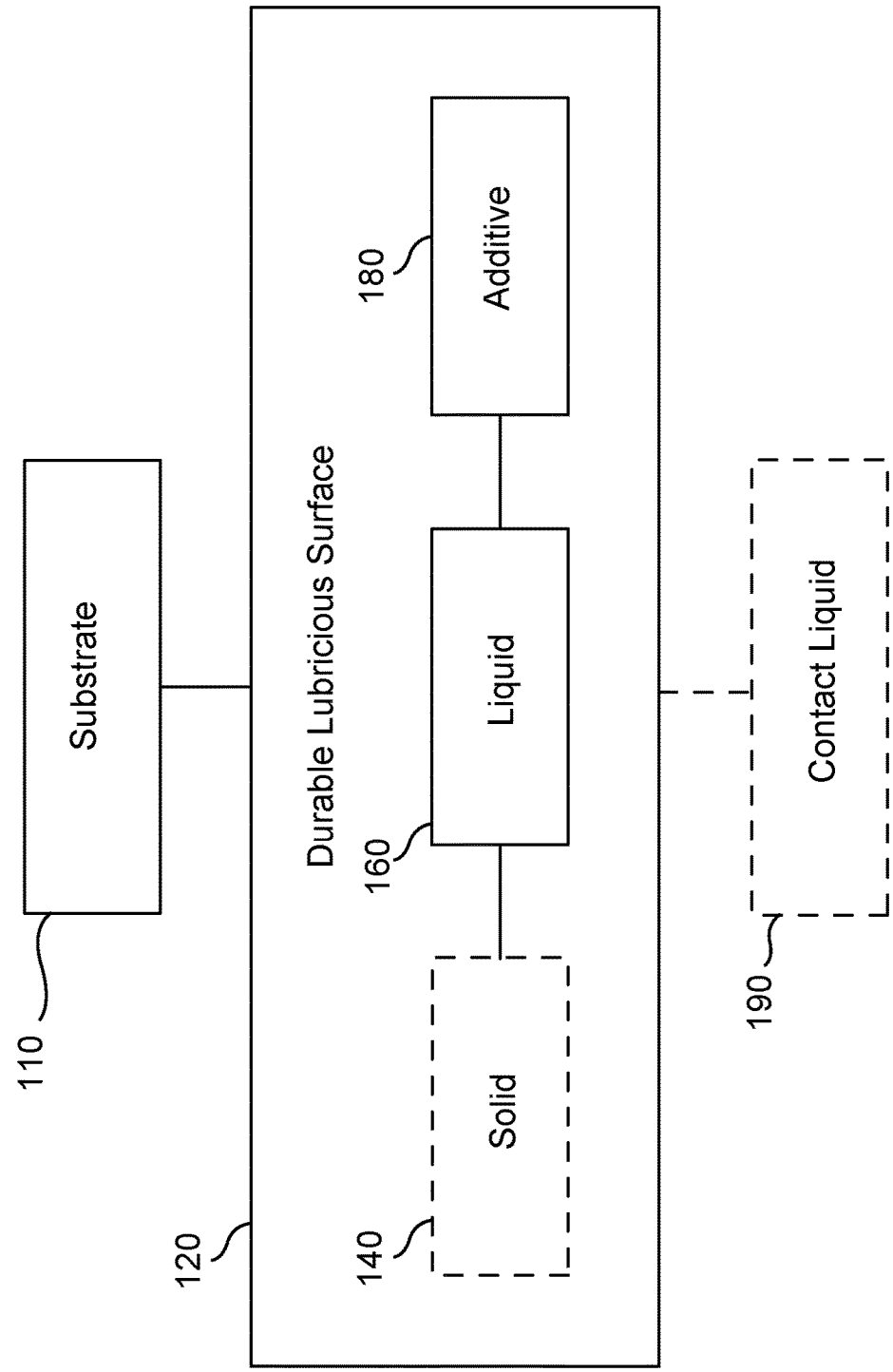
FIG. 1 shows a schematic block diagram of various components of a durable lubricious surface with enhanced durability, according to an embodiment.

Engineered surfaces with specifically designed chemical properties and structural features can possess substantial non-wetting properties that can be useful in a wide variety of commercial and technological applications. Hydrophobic surfaces in nature, for example, such as the lotus plant, includes air pockets trapped within the micro- or nano-textured features present on its surface to increase the contact angle of a contact liquid (e.g., water or any other aqueous liquid) disposed on the hydrophobic surface. Inspired by nature, non-wetting surfaces can also be engineered by disposing a liquid impregnated surface on a substrate. Such liquid impregnated surfaces can be super hydrophobic, can be configured to resist ice and frost formation, and can be highly durable.

Embodiments described herein relate generally to systems and methods for creating durable lubricious surfaces (DLS) via interfacial modification. Lubricious surfaces as discussed herein include surface liquid layers with increased durability due to an interfacial modifier additive that migrates to the interface between a contact liquid and the surface liquid, forming a contacting phase or boundary region. According to some embodiments, lubricious surfaces as discussed herein include liquid impregnated surfaces (LIS) and enhanced liquid impregnated surfaces (ELIS) comprising impregnating liquids that are impregnated in a surface that includes a matrix of solid features defining interstitials regions, such that the interstitial regions include the impregnating liquid. The impregnating liquid is configured to wet the solid surface preferentially and adhere to the micro-textured surface with strong capillary forces, such that the DLS or ELIS has a roll off angle or slide-off angle less than that of the native surface or substrate (e.g., a slide-off/roll-off angle of less than about 5 degrees). This enables the contact liquid to slide with substantial ease on the DLS or enhanced liquid-impregnated surface. Therefore, the DLSs described herein provide certain significant advantages over conventional super hydrophobic surfaces including: (i) such lubricious surfaces have low hysteresis, (ii) have self-cleaning properties, (iii) can withstand high drop impact pressure (i.e., are wear resistant), (iv) can self-heal by capillary wicking upon damage; and (v) can enhance condensation. Examples of durable lubricious surfaces such as liquid impregnated surfaces, methods of making liquid impregnated surfaces and applications thereof, are described in U.S. Pat. No. 8,574,704 (also referred to as "the '704 patent"), entitled "Liquid-Impregnated Surfaces, Methods of Making, and Devices Incorporating the Same," issued Nov. 5, 2013, and U.S. Publication No. 2014/0178611 (also referred to as "the '611 publication"), entitled "Apparatus and Methods Employing Liquid-Impregnated Surfaces," published Jun. 26, 2014, the contents of which are hereby incorporated herein by reference in their entirety. Examples of materials used for forming the solid features on the surface, impregnating liquids, applications involving edible contact liquids, are described in U.S. Pat. No. 8,940,361 (also referred to herein as "the '361 patent"), entitled "Self-Lubricating Surfaces for Food Packaging and Food Processing Equipment," issued Jan. 27, 2015, the contents of which are hereby incorporated herein by reference in their entirety. Examples of non-toxic liquid impregnated surfaces are described in U.S. Publication No. 2015/0076030 (also referred to as "the '030 publication"), entitled "Non-toxic Liquid Impregnated Surfaces," published Mar. 19, 2015, the content of which is hereby incorporated herein by reference in its entirety. Examples of liquid impregnated surfaces having reduced area emerged fraction of solid features are described in U.S. Patent Publication No. 2015/0306642, entitled "Apparatus and Methods Employing Liquid-Impregnated Surfaces," published Oct. 29, 2015, the content of which is hereby incorporated herein by reference in its entirety.

Embodiments according to the present disclosure include DLSs that are enhanced to improve durability during repeated and prolonged interactions with a contact liquid (e.g., product) or to improve performance. As described herein, when certain contact liquids are placed in contact with a DLS, the performance of the DLS can breakdown due to characteristics of the contact liquid. For example, certain classes of non-Newtonian liquids, such as contacting Bingham plastics or other liquids that exhibit a yield stress ("yield stress liquids"), can degrade some liquid impregnated surfaces by dissolving or emulsifying and removing at least a portion of the impregnating liquid, which can lead to pinning and other undesired effects. In some instances, a combination of rheology (thickness), chemistry, and/or thermodynamic characteristics of the contact liquid can compromise the DLS and lead to sub-optimal performance. Consumer packaged goods, such as lotions and/or toothpastes, are some examples of non-Newtonian contact liquids that can include surfactants to enhance foaming, reduce surface tension, and/or for any number of reasons. Without wishing to be bound to any particular theory, if the DLS comes into direct contact with the surfactants in the contact liquid, the surfactants can cause harmful thermodynamic effects that compromise the lubricous surface. Without wishing to be bound to any particular theory, for certain contact liquid and lubricious surface liquid combinations, the surfactants can undergo undesirable reactions when they come in contact with the lubricating liquid on the DLS. This contact can result in alteration of mechanical and/or chemical properties of the DLS, which can lead to degradation of the lubricious surface.

In order to enhance a DLS or LIS, its chemical and/or physical properties can be carefully selected to create a custom enhancement for a specific or specific class of contact liquid. In other words, there is no "one-size-fits-all" when creating a DLS. Therefore, the properties of the DLS as well as those of the contact liquid are carefully matched so that the enhanced DLS or ELIS is specifically designed to improve performance and withstand repeated and prolonged interactions with the contact liquid (or with certain classes of contact liquids). As such, the physical, chemical, and electronic properties, including properties of the solid, the impregnating liquid, and the substrate, are selected to create a DLS or ELIS designed for the particular viscosity, rheology, miscibility, concentration, and pH, etc. of the contact liquid (or class of contact liquids). A "durable lubricious surface" (DLS) is a class of engineered surfaces with increased lubricity, wherein "liquid-impregnated surfaces" (LISs), and "enhanced liquid-impregnated surfaces" (ELISs) are a non-exhaustive list of specific embodiments that can be included within the durable lubricious surface class of surfaces.

In some embodiments, an interfacial modifier (IM) additive can be included in the lubricating liquid or impregnating liquid, configured such that the IM migrates to form a secondary interface and become to contact phase, in order to "cloak" the contact liquid so that the contact liquid can be insulated (or prevented) from contacting the DLS or LIS. In some embodiments, an IM can be included in the LIS to protect the LIS as well as to prolong its interfacial properties. More specifically, the IM in the ELIS is designed to modify the interfacial rheology between the contact liquid and the LIS. This approach can work well as an enhancement for LISs for use with contact liquids, such as contacting yield stress liquids. Said another way, an IM can be used for targeted alteration of the interface between the contact liquid and the LIS to shield the LIS from potential damages that can be caused by the harmful effects of surfactants, or other harmful characteristics of contact liquids, such as the contacting yield stress liquids. In some embodiments, the IM alters the properties of the contacting phase (i.e., boundary region) at the interface, the modified region being an interface with properties that are unique from the liquid or the contacting phase.

In some embodiments, the modification of the interface can begin with inclusion of an additive in the formulation of the LIS. In some embodiments, the modification of the interface can begin by subsequently adding the additive after the LIS has been formed. In either approach, the additive included in the ELIS is designed to preferentially adhere to the contact liquid over the US. Hence, upon application of the ELIS, the additive migrates towards the contact liquid, rather than to the LIS. Without wishing to be bound to any particular theory, the IMs may migrate to the interface due to a gradient in chemical potential. These additives are localized at the interface largely due to the rheological properties of the modifiers and product (e.g., non-Newtonian, Bingham plastic products). In some embodiments, the IM may preferentially migrate out of the ELIS and into the contact liquid. In some embodiments, the migration of the IM into the contact liquid may cause a rheological change to the contact liquid, the ELIS, or both. In some embodiments, the ELIS may become less sticky (more lubricious) after migration of the IM into the contact liquid. In some embodiments, the contact liquid may become more viscous after migration of the IM into the contact liquid. In some embodiments, the roll-off angle of the contact liquid (now including the migrated IM) on the ELIS may decrease after migration of the IM into the contact liquid.

After application of the ELIS and preferential migration of additive towards the contact liquid, the newly modified interface may effectively become the contacting surface of the contact liquid, which now possesses altered properties at the interface. This newly altered interface provides an improved rheology, topography, surface chemistry and thermodynamic characteristics of the contact liquid at the interface in a way that enhances the lubricity by providing thermal insulation and reducing the potentially detrimental effect of surfactants without materially altering the bulk properties of contact liquid anywhere but at the interface with the liquid impregnated interface. This can be achieved by inclusion of an immiscible additive to the contact liquid to ensure that the IM does not to alter the chemical structure and/or functional properties of the contact liquid.

As used herein, a "partition coefficient" is hereby defined as the ratio of the concentrations of a solute in two immiscible or slightly miscible liquids, when it is in equilibrium across the interface between them. In other words, the partition coefficient describes the rate and extent of separation of two liquids initially in solution that are not completely miscible either with the other. In some embodiments of the application of DLS, the partition coefficient, $P_{coating/product}$, can be used to describe the rate of separation of the IM from the impregnation liquid. In some embodiments of the application of DLS, the partition coefficient can be used to describe the extent of separation of the IM from the impregnation liquid. In some embodiments of the application of DLS, the partition coefficient can be used to describe the rate and extent of separation of the IM from the impregnation liquid. In other words, since the migration of IM away from the substrate (towards the contact liquid) is advantageous in some embodiments for which the IM becomes the primary interface between the LIS and the contact liquid, the partition coefficient parameter can be used to select an IM additive that migrates to the interface with the contact liquid sufficiently quickly and extensively.

In some embodiments, the partition coefficient parameter can be defined as $$P_{coating/product} = \frac{[IM]^{eq}_{coating}}{[IM]^{eq}_{product}}$$

$[IM]_{coating}^{eq}$ and $[IM]_{product}^{eq}$ product are the concentrations of the IM in the lubricating liquid and the product in a system at equilibrium, respectively. In some embodiments, for the IM to prefer to reside in the product phase it must satisfy $P_{coating/product}<1$. In some embodiments, and for many IMs examined, the IM strongly prefers to reside in the product phase and satisfies a more stringent condition of $P_{coating/product}<k$, where k is some number that satisfies $k<<1$.

In some embodiments of the application of DLS, an IM can include, for example, a material that enables crosslinking by formation of hydrogen bonding or other physical crosslinking within itself as well as on to the surface of a water-rich contact liquid. In some embodiments, the DLS (e.g., LIS) can be generally hydrophobic. In some embodiments, the hydrophilicity of the IM can help protect the interface with a hydrophobic LIS by reducing interaction between the hydrophobic impregnating liquid and the hydrophilic modified interface of the contact liquid. In some embodiments, the DLS (e.g. LIS) can be generally hydrophilic. In some embodiments, the hydrophobicity of the IM can help protect the interface with a hydrophilic LIS by reducing interaction between the hydrophilic impregnating liquid and the hydrophobic modified interface of the contact liquid. Some of the material classes that exhibit this property include but are not limited to polysaccharides, thermoplastic elastomers, cross-linked polyacrylic acids, waxy solids, and the like. Some examples of polysaccharides include xanthan gum, guar gum, cellulose gum, chitin, etc. Some examples of thermoplastic elastomers include are is not limited to styrene ethylene butylene styrene (SEBS), thermoplastics (TPU), etc. SEBS, which is good at capturing and retaining oils to form a homogeneous and elastic gel, is actually a form of thermoplastic elastomer (TPE) with styrene added. SEBS further includes polyolefin plastics such as polyethylene (PE) and polypropylene (PP). Some examples of cross-linked polyacrylic acids include but are not limited to sodium polyacrylate, polycarbophil, carbomers (e.g., Lubrizol carbomers), and calcium polyacrylate. Some examples of waxy solids include carnauba wax, candelilla wax, beeswax, and synthetic waxes such as silicone waxes, hydrocarbon waxes, and perfluoropolyether (PFPE) greases.

In some embodiments, certain IMs can be formulated to work well with contact liquids, such as contacting yield stress liquids, Bingham plastics, or other non-Newtonian liquids that have a high viscosity. Examples of such contact liquids include but are not limited to lotions, gels, toothpaste, ketchup, shampoo, honey mustard, peanut butter, Nutella, chocolate sauces, cheese whiz, marshmallow fluff, meat slurry, yogurt, mayonnaise, pudding, jelly, jam, etc. While IMs can be used with LISs used in packaging, they can also be used in dynamic environments such as pipes or tanks, with yield stress liquids like paint or oil. Further, IMs can be used with certain surfactant rich products, such as lotions and toothpaste, because the IM can protect the LIS from harmful thermodynamic effects as described herein.

A DLS can be formed on a substrate in any of a number or ways. For example, an additive can be included in a single-spray coating or it can be sprayed onto a LIS that has already been applied to a substrate. In the instance where the additive is included as a component of the LIS during the formation stage, the additive can migrate through the LIS to the contact liquid. In the instance where the additive is sprayed on top of an existing LIS, the additive is disposed on top of the LIS and attracted to the contact liquid upon contact with the contact liquid.

In some embodiments, the DLS offers the following key advantages including: i) cloaking of the contact liquid; ii) prevent degradation of the DLS; iii) the existence of the altered interface (i.e., 'contacting phase' or 'boundary region') can help prolong slipperiness and enhance durability. In some embodiments, the methods of making DLS can be substantially similar to the methods of producing a DLS. In some embodiments, the methods of making the DLS can be substantially similar to the methods of producing a liquid-impregnated surface. In some embodiments, the methods of making the DLS can be substantially similar to the methods of producing the ELIS. In some embodiments, an ELIS can be viewed as a special category of DLSs with enhanced properties. Therefore, the general methods of making an ELIS can be substantially similar to the methods of making a DLS. As such, an ELIS, much like a LIS or DLS, can be disposed on any substrate, for example, on the inner surface of containers or vessels, and can be configured to present a non-wetting surface to a wide variety of products, for example, food products, pharmaceuticals, nutraceuticals, health and beauty products, consumer products, or any other product, such that the product can be evacuated, detached, or otherwise displaced with substantial ease from the LIS.

In some embodiments, a spreading parameter ("$S_{scp}$") is the extent of which a coating can spread across a surface based upon interfacial tensions. In other words, a surface coating should spread underneath a product and IMs (i.e., the contacting phase) described herein may allow coatings in some embodiments to spread underneath the interface modified layer of the product when that coating may not otherwise spread underneath an unmodified interfacial layer. In some embodiments, the spreading parameter may be defined using $S_{scp} = \gamma_{ps} - \gamma_{cs} - \gamma_{cp}$ where $\gamma_{ps}$, $\gamma_{cs}$, and $\gamma_{cp}$ are the product/solid, coating/solid, and coating/product interfacial tensions, respectively. In some embodiments, $S_{scp} > 0$ allows the coating to spontaneously spread underneath the product. In some embodiments, $S_{sc(p,IM)} = \gamma_{(p,IM)s} - \gamma_{cs} - \gamma_{c(p,IM)}$ where $S_{sc(p,IM)}$ and $\gamma_{(p,IM)s}$ are the interface modified product/solid and coating/interface spontaneous spreading coefficients related to the amount of spontaneous spread underneath the interface modified layer of the product. In some embodiments, use of a particular IM may allow $S_{sc(p,IM)} > 0$ to be maintained while $S_{scp} < 0$, enabling previously inaccessible coating-product combinations.

In some embodiments, shearing of a product at the coating-product interface is undesirable (e.g., for products with yield stresses). In some embodiments, the coating is designed to have reduced yield stress so that the coating yields at lower stresses than the product. In some embodiments, IMs can be used to increase the yield stress of the product at the interface modified layer, which can improve the performance of the LIS, and can allow allowing for coatings with higher yield stresses to be used. In some embodiments, $\tau_c$ and $\tau_p$ can be defined as the yield stresses of the coating and product, respectively. In some embodiments, the yield stress of the coating is engineered be less than the yield stress of the product, $\tau_p > \tau_c$, in order for the coating to be able to shear at a specific stress without the product shearing at the same stress. In some embodiments, an IM can result in $\tau_{p,IM} > \tau_p$, which can improve the performance and durability of the coating, where $\tau_{p,IM}$ is the yield stress of the interface modified layer of the product. In some embodiments, for a coating-product composition for which $\tau_p < \tau_c$, an IM can result in $\tau_{p,IM} > \tau_c > \tau_p$, enabling previously inaccessible coating-product combinations.

As used herein, the term "about" and "approximately" generally mean plus or minus 10% of the value stated, for example about 250 μm would include 225 μm to 275 μm, approximately 1,000 μm would include 900 μm to 1,100 μm.

As used herein, the term "contact liquid", "fluid" and "product" are used interchangeably to refer to a solid or liquid that flows, for example a non-Newtonian fluid, contacting yield stress liquid, a Bingham fluid, or a thixotropic fluid and is contact with a liquid impregnated surface, unless otherwise stated.

As used herein, the term "roll off angle" refers to the inclination angle of a surface at which a drop of a liquid disposed on the surface starts to roll.

As used herein, the term "spray" refers to an atomized spray or mist of a molten solid, a liquid solution, or a solid particle suspension.

As used herein, the term "complexity" is equal to (r−1)× 100% where r is the Wenzel roughness.

As used herein, the term "average thickness" is the total liquid volume divided by the total coated surface area.

As used herein, the term "lubricity" is the speed of travel of a material across a lubricious surface.

FIG. 1 is a schematic illustration of a DLS, according to an embodiment. The system includes a substrate 110 and a DLS 120 comprising an additive 180. In some embodiments, the DLS 120 can include a liquid 160 and the additive 180. In some embodiments, the impregnating liquid 160 can be immiscible with water. In some embodiments, the impregnating liquid 160 can be immiscible with certain classes of the contact liquid 190. Some of the examples of the impregnating liquid 160 that are immiscible with certain classes of the contact liquid 190 include silicone oils, fluorinated hydrocarbons, fluorinated perfluoropolyethers, and hydrocarbon liquids including mineral oil, paraffin oil, C13-C14 isoparaffins, C16-C18 isoparaffins, diglycerides and triglycerides.

In some embodiments, the DLS 120 can include the liquid 160, solid particles (not shown) disposed in the liquid 160, and the additive 180. The solid particles can be formulated to modify the viscosity and/or rheological properties of the liquid. In some embodiments, the DLS 120 can include a solid 140, the liquid 160, and the additive 180. In some embodiments, the DLS 120 can include the solid 140, the liquid 160, solid particles disposed in the liquid 160, and the IM additive 180. In some embodiments, the DLS 120 can include a dynamic matrix of the solid 140 surrounded by domains of the liquid 160. In some embodiments, the IM additive 180 can migrate to the surface of the DLS 120 upon contact with a contact liquid 190. In some embodiments, the substrate 110 can have features on its surface that can aid in forming a portion of, or that can itself become a component of, the DLS 120. In some embodiments, the DLS 120 can be formulated to modify the interface of the DLS 120 to increase "slipperiness" with respect to the contact liquid 190.

In some embodiments, solid particles can be added to the liquid 160 in order to achieve the desired rheology, viscosity, shear strength, any other physical, chemical and mechanical properties, and any combination thereof. In some embodiments, the particles can be added to the liquid 160 topping the solid features disposed on the substrate 110 in order to achieve the desired rheology, viscosity, shear strength, any other physical, chemical and mechanical properties, and any combination thereof. In some embodiments, particles can form a particle-laden lubricant on the substrate 110 stabilized against deformation or depletion by interfacial forces enhanced due to the interfacial modifier additive 180. In some embodiments, the particle-laden lubricant comprising the liquid and particles is stabilized by the IM additive 180 resulting in greater shear strength, burst strength, compressive strength, tensile strength, impingement resistance, any other mechanical properties, or any combination thereof for at least one of a the DLS 120 and the substrate 110.

In some embodiments, particles can consist of, for example but not limited to, insoluble fibers (e.g., purified wood cellulose, micro-crystalline cellulose, and/or oat bran fiber), wax (e.g., carnauba wax, Japan wax, beeswax, candelilla wax), other polysaccharides, fructo-oligosaccharides, metal oxides, montan wax, lignite and peat, ozokerite, ceresins, bitumens, petrolatuns, paraffins, microcrystalline wax, lanolin, esters of metal or alkali, flour of coconut, almond, potato, wheat, pulp, zein, dextrin, cellulose ethers (e.g., Hydroxyethyl cellulose, Hydroxypropyl cellulose (HPC), Hydroxyethyl methyl cellulose, Hydroxypropyl methyl cellulose (HPMC), Ethyl hydroxyethyl cellulose), ferric oxide, ferrous oxide, silicas, clay minerals, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether (PFPE), polychlorotetrafluoroethylene (PCTFE), polyvinyl alcohol (PVA), polyethyleneglycol (PEG), Tecnoflon cellulose acetate, poly(acrylic acid), poly(propylene oxide), D-sorbitol, polycarbonate, one or more members from the following list of Styrenic Block copolymers, including but not limited to, SEP: Polystyrene-b-poly(ethylene/propylene), SEPS: Polystyrene-b-poly(ethylene/propylene)-b-polystyrene, SEBS: Polystyrene-b-poly(ethylene/butylene)-b-polystyrene, SEEPS: Polystyrene-b-poly(ethylene-ethylene/propylene)-b-polystyrene, SIS: Styrene-Isoprene-Styrene; one or more members from the following list of Poly-olefin based thermoplastic elastomers, including but not limited to, Ethylene-Propylene random copolymer (EPM), Hydrogenated polybutadiene-isoprene-butadiene block copolymer, one or more members from the following list of Polyamide based thermoplastic elastomers, including but not limited to, Polyesteramides (PEA), Polyetheresteramides (PEEA), Polycarbonate esteramides (PCEA), Polyether-block-amides (PE-b-A); and one or more members from the following list of Polyacrylate based thermoplastic elastomers, including but not limited to, Poly(MMA-b-tBA-MMA) and Poly(MMA-b-alkyl acrylate-MMA), any other material described or listed herein, or any combination thereof.

In some embodiments, particles can range in size from about 10 nm to about 100 μm, from about 50 nm to about 50 μm, from about 500 nm to about 25 μm, from about 500 nm to about 20 μm, or from about 750 nm to about 50 μm, from about 500 nm to about 20 μm, inclusive of all values and ranges therebetween. In some embodiments, the particles can be substantially uniform in size. In some embodiments, the particles can be substantially non-uniform in size. In some embodiments, the particles can be porous, with pores ranging in size from about 5 nm to about 5 μm, from about 5 nm to about 500 nm, from about 5 nm to about 50 nm, from about 5 nm to about 250 nm, from about 50 nm to about 500 nm, from about 500 nm to about 5 μm, from about 500 nm to about 4 μm, from about 1 μm to about 3 μm, or from about 500 nm to about 2 μm, inclusive of all values and ranges therebetween. In some embodiments, the particles can be shaped, coated, treated, charged, magnetized, irradiated, chemically treated, heated, cooled, excited, bombarded with energy, hardened, weakened, attached, modified according to any other method known by a practitioner generally well-versed in the art, or any combination thereof, such that any contacting phase and contact liquid interaction characteristics described herein can be accomplished accordingly.

In some embodiments, particles can consist of pH-responsive materials, materials with non-uniform surface modification (such as partial hydrophobic treatment of a hydrophilic surface), materials with varied and heterogeneous chemical composition, broad molecular weight distributions, amphiphilic character, shape anisotropy such as discs (see Laponite clays), multiple materials with synergistic networking behavior. These materials can range in size from 5 nm to 500 um. In some embodiments, particles can range in size from 50 nm to 500 nm, or from 500 nm to 5 μm, or from 500 nm to 20 μm, inclusive of all values and ranges therebetween. In some embodiments, the particles can be substantially uniform in size. In some embodiments, the particles can be substantially non-uniform in size. In some embodiments, the particles can be porous, with pores ranging in size from 5 nm to 50 nm, 50 nm to 500 nm, or from 500 nm to 5 um. In some embodiments, the particles can be coated, treated, charged, magnetized such that they respond (deform, swell, contract, move, etc.) to externally-applied stimuli such as magnetic or electric fields, changes in pH or ionic strength, light, gradients in surface tension, concentration or, most broadly, Gibbs free energy.

In some embodiments, the substrate 110 can include, for example, one or more tubes, bottles, vials, flasks, molds, jars, tubs, cups, caps, glasses, pitchers, barrels, bins, totes, tanks, kegs, tubs, syringes, tins, pouches, lined boxes, hoses, cylinders, and cans. The substrate 110 can be constructed in almost any desirable shape. In some embodiments, the substrate 110 can include hoses, piping, conduit, nozzles, syringe needles, dispensing tips, lids, pumps, and other surfaces for containing, transporting, or dispensing the contact liquid 190. The substrate 110 can be constructed from any suitable material including, for example, plastic, glass, metal, coated fibers, any other material appropriate for a given application, or combinations thereof. Suitable surfaces of the substrate 110 can include, for example, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether (PFPE), polychlorotetrafluoroethylene (PCTFE), polyvinyl alcohol (PVA), polyethyleneglycol (PEG), Tecnoflon cellulose acetate, poly(acrylic acid), poly(propylene oxide), D-sorbitol, polycarbonate, or combinations thereof. In some embodiments, the substrate 110 can be constructed of rigid or flexible materials. Foil-lined or polymer-lined cardboard or paper boxes can also be used to form the substrate 110. In some embodiments, substrate 110 can have a flat surface, for example an inner surface of a prismatic container, or a contoured surface, for example an inner surface, of a circular, oblong, elliptical, oval or otherwise contoured container.

In some embodiments, the substrate 110 can have a surface that has inherent surface structures, and/or a surface that is chemically and/or physically modified. For example, the substrate 110 can have a surface that is flat, bumpy, smooth, textured with regular periodic patterns, or textured with random shapes and contours. In some embodiments, the substrate 110 can be etched, sandblasted, engraved, or otherwise have material subtracted (e.g., removed) from its surface to create the textured surface. In other embodiments, the substrate 110 can have materials added (e.g., deposited) to its surface to create the textured surface. In some embodiments, the substrate 110 can have texture or roughness formed into the surface (e.g. by embossing, knurling, or stamping). In some embodiments, the substrate 110 can have a surface texture formed during and/or after the creation of the substrate 110 without any subsequent modification to its surface.

In some embodiments, the substrate 110 can include containers with inherent roughness (complexity equal to or greater than 10%) that results in better performance with the addition of the liquid impregnated surface. Examples of substrates 110 with good performance include high-density polyethylene.

In some embodiments, the substrate 110 can have a plurality of solid features that are disposed on the surface of the substrate 110, such that the plurality of solid features define interstitial regions between the plurality of solid features. The surface of the substrate 110 can comprise posts, spheres, micro/nano needles, nanograss, pores, cavities, interconnected pores, inter connected cavities, and/or any other random geometry that provides a micro and/or nano surface roughness. In some embodiments, the height of features can be about 1 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 nm, about 900 µm, up to about 1 mm, inclusive of all ranges therebetween, or any other suitable height for receiving the liquid 160. In some embodiments, the height of the solids features can be less than about 1 µm. For example, in some embodiments, the solid features can have a height of about 1 nm, about 5 nm, about 10 nm, about 20 nm, about 30 nm, about 40 nm, about 50 nm, about 100 nm, about 200 nm, about 300 nm, about 400 nm, about 500 nm, about 600 nm, about 700 nm, about 800 nm, about 900 nm, or about 1,000 nm, inclusive of all ranges therebetween. Furthermore, the height of solid features can be, for example, substantially uniform. In some embodiments, the solid features can have an interstitial spacing, for example, in the range of about 1 µm to about 100 µm, about 1 µm to about 10 µm, or 5 nm to about 1 µm. In some embodiments, the substrate 110 can have textured surface comprising of hierarchical features, for example, micro-scale features that further include nano-scale features thereupon. In some embodiments, the surface of the substrate 110 can be isotropic. In some embodiments, the surface of the substrate 110 can be anisotropic.

In some embodiments, the substrate 110 can have solid features formed in, or otherwise disposed on its surface using any suitable method. For example, some solid features can be disposed on the inside of the substrate 110 (e.g., a bottle or other food container) or be integral to the surface itself (e.g., the textures of a polycarbonate bottle may be made of polycarbonate). In some embodiments, some of the solid features on the substrate 110 may be formed of a collection or coating of particles including, but not limited to insoluble fibers (e.g., purified wood cellulose, microcrystalline cellulose, and/or oat bran fiber), wax (e.g., carnauba wax, Japan wax, beeswax, candelilla wax), other polysaccharides, fructo-oligosaccharides, metal oxides, montan wax, lignite and peat, ozokerite, ceresins, bitumens, petrolatuns, paraffins, microcrystalline wax, lanolin, esters of metal or alkali, flour of coconut, almond, potato, wheat, pulp, zein, dextrin, cellulose ethers (e.g., Hydroxyethyl cellulose, Hydroxypropyl cellulose (HPC), Hydroxyethyl methyl cellulose, Hydroxypropyl methyl cellulose (HPMC), Ethyl hydroxyethyl cellulose), ferric oxide, ferrous oxide, silicas, clay minerals, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey and/or any other edible solid particles described herein or any combination thereof.

In some embodiments, solid features of the substrate 110 can be created by exposing the substrate 110 (e.g., polycarbonate) to a solvent (e.g., acetone). For example, the solvent may impart texture by inducing crystallization (e.g., polycarbonate may recrystallize when exposed to acetone). In some embodiments, solid features on the substrate 110 can be disposed by dissolving, etching, melting, reacting, treating, or spraying on a foam or aerated solution, exposing the surface to electromagnetic waves such as, for example ultraviolet (UV) light or microwaves, or evaporating away a portion of a surface, leaving behind a textured, porous, and/or rough surface that includes a plurality of the solid features. In some embodiments, solid features on the substrate 110 can be defined by mechanical roughening (e.g., tumbling with an abrasive), spray-coating or polymer spinning, deposition of particles from solution (e.g., layer-by-layer deposition, evaporating away liquid from a liquid/particle suspension), and/or extrusion or blow-molding of a foam, or foam-forming material (for example a polyurethane foam). In some embodiments, solid features on the substrate 110 can also be formed by deposition of a polymer from a solution (e.g., the polymer forms a rough, porous, or textured surface); extrusion or blow-molding of a material that expands upon cooling, leaving a wrinkled surface; and application of a layer of a material onto a surface that is under tension or compression, and subsequently relaxing the tension or compression of surface beneath, resulting in a textured surface.

In some embodiments, solid features on the substrate 110 are disposed through non-solvent induced phase separation of a polymer, resulting in a sponge-like porous structure. For example, a solution of polysulfone, poly(vinylpyrrolidone), and DMAc may be cast onto a substrate and then immersed in a bath of water. Upon immersion in water, the solvent and non-solvent exchange, and the polysulfone precipitates and hardens.

In some embodiments, the substrate 110 can include micro-scale features such as, for example, posts, spheres, nano-needles, pores, cavities, interconnected pores, grooves, ridges, interconnected cavities, or any other random geometry that provides a micro and/or nano surface roughness. In some embodiments, some of the solid features on the substrate 110 can include particles that have micro-scale or nano-scale dimensions which can be randomly or uniformly dispersed on a surface. Characteristic spacing between the solid features can be about 1 mm, about 900 µm, about 800 µm, about 700 µm, about 600 µm, about 500 µm, about 400, µm, about 300 µm, about 200 µm, about 100 µm, about 90

µm, about 80 µm, about 70 µm, about 60 µm, about 50 µm, about 40 µm, about 30 µm, about 20 µm, about 10 µm, about 5 µm, 1 µm, or 100 nm, about 90 nm, about 80 nm, about 70 nm, about 60 nm, about 50 nm, about 40 nm, about 30 nm, about 20 nm, about 10 nm, or about 5 nm. In some embodiments, characteristic spacing between the solid features can be in the range of about 100 µm to about 100 nm, about 30 µm to about 1 µm, or about 10 µm to about 1 µm. In some embodiments, characteristic spacing between the solid features can be in the range of about 100 µm to about 80 µm, about 80 µm to about 50 µm, about 50 µm to about 30 µm, about 30 µm to about 10 µm, about 10 µm to about 1 µm, about 1 µm to about 90 nm, about 90 nm to about 70 nm, about 70 nm to about 50 nm, about 50 nm to about 30 nm, about 30 nm, to about 10 nm, or about 10 nm to about 5 nm, inclusive of all ranges therebetween.

In some embodiments, the substrate 110 can have, for example solid particles of average dimension of about 200 µm, about 100 µm, about 90 µm, about 80 µm, about 70 µm, about 60 µm, about 50 µm, about 40 µm, about 30 µm, about 20 µm, about 10 µm, about 5 µm, 1 µm, about 100 nm, about 90 nm, about 80 nm, about 70 nm, about 60 nm, about 50 nm, about 40 nm, about 30 nm, about 20 nm, about 10 nm, or about 5 nm. In some embodiments, the average dimension of the solid particles disposed on the substrate 110 can be in the range of about 100 µm to about 100 nm, about 30 µm to about 10 µm, or about 20 µm to about 1 µm. In some embodiments, the average dimension of the solid particles can be in the range of about 100 µm to about 80 µm, about 80 µm to about 50 µm, about 50 µm to about 30 µm, or about 30 µm to about 10 µm, or 10 µm to about 1 µm, about 1 µm to about 90 nm, about 90 nm to about 70 nm, about 70 nm to about 50 nm, about 50 nm to about 30 nm, about 30 nm, to about 10 nm, or about 10 nm to about 5 nm, inclusive of all ranges therebetween. In some embodiments, the height of features on the substrate 110 can be substantially uniform. In some embodiments, the substrate 110 can include hierarchical features, for example micro-scale features that further include nano-scale features disposed thereupon.

In some embodiments, the substrate 110 can have a porous surface comprising a plurality of particles. The characteristic pore size port widths or lengths) of the plurality of particles can be about 5,000 nm, about 3,000 nm, about 2,000 nm, about 1,000 nm, about 500 nm, about 400 nm, about 300 nm, about 200 nm, about 100 nm, about 80 nm, about 50, or about 10 nm, inclusive of all ranges therebetween. In some embodiments, the characteristic pore size can be in the range of about 200 nm to about 2 µm, or about 10 nm to about 1 µm, inclusive of all ranges therebetween.

In some embodiments, the DLS 120 can be formed by a number of methods substantially similar to those described in the '704 patent, the '522 publication, and the '361 patent. The DLS 120 can be configured and/or formulated to prevent the contact liquid 190 from adhering to the substrate 110 by forming a liquid impregnated surface layer on the substrate 110. In some embodiments, the DLS 120 can be configured and/or formulated to prevent the contact liquid 190 from damaging or degrading the liquid impregnated surface as formed on the substrate 110. The DLS 120 can be engineered to coat the substrate 110 by utilizing one or more technical approaches, including but not limited to, forming a dynamic matrix of polymer (or more generally solid 140), one or more liquids (liquid 160, which are immiscible with the contact liquid 190), and the additive 180 that can migrate to the interface near the contact liquid 190 so as to form an interfacial layer that substantially separates the impregnating liquid 160 and the contact liquid 190.

In some embodiments, the solid 140 can include different materials, including surface features already present on the substrate 110. As described herein, the solid 140 can include one or more members from the following list of Styrenic Block copolymers, including but not limited to, SEP: Poly-styrene-b-poly(ethylene/propylene), SEPS: Polystyrene-b-poly(ethylene/propylene)-b-polystyrene, SEBS: Polystyrene-b-poly(ethylene/butylene)-b-polystyrene, SEEPS: Polystyrene-b-poly(ethylene-ethylene/propylene)-b-polystyrene, SIS: Styrene-Isoprene-Styrene; one or more members from the following list of Poly-olefin based thermoplastic elastomers, including but not limited to, Ethylene-Propylene random copolymer (EPM), Hydrogenated polybutadiene-isoprene-butadiene block copolymer; one or more members from the following list of Polyamide based thermoplastic elastomers, including but not limited to, Polyesteramides (PEA), Polyetheresteramides (PEEA), Polycarbonate esteramides (PCEA), Polyether-block-amides (PE-b-A); and one or more members from the following list of Polyacrylate based thermoplastic elastomers, including but not limited to, Poly(MMA-b-tBA-MMA) and Poly(MMA-b-alkyl acrylate-MMA).

In some embodiments, the solid 140 can comprise a matrix of solid features formed from one or more of materials from some classes of gel forming materials. Some of the gel forming solids include categories of polymers and copolymers, such as hydrocarbon polymers, star polymers, block copolymers, silicones, specifically elastomers, alkyl silicone waxes, hydrocarbon waxes, polymethylsilsesquioxane, vinyl dimethicone copolymers, gelatin, chitin, chitosan, carboxymethylcellulose, ethyl cellulose, cellulose acetate, cellulose esters. In some embodiments, the gel forming solids/materials include materials which are formed in to gel by the infusion of several classes of liquids. Such materials have the material property of being able to absorb liquids of certain classes and result in self-assembled solid features or structures of the type that are classified under the category of gels. In some embodiments, this is defined as having viscoelastic properties typical of gel materials defined by storage modulus, loss modulus and a phase angle measured in tensile and shear loads.

In some embodiments, the solid 140 can also comprise some classes of gel forming liquids. When mixed with gel forming solids, the gel forming materials result in gel formation including but not limited to hydrocarbon liquids, such as for example, mineral oil, paraffin oil, C13-C14 isoparaffins, C16-C18 isoparaffins, di- and triglyceride esters, tri alkyl esters of citric acid, glycerol di- and triesters, esters of myristates, adipates, sebacates.

In some embodiments, the liquid 160 can be a solvent liquid. As described herein, some examples of solvent liquids can include hydrocarbon liquids, esters, and ethers. Examples of hydrocarbon liquids include, but are not limited to alkane liquids and mixture of alkanes, C13-C16 isoparaffins, isohexadecane, mineral oils, napthenic oils, polyisobutene and hydrogenated version of the same, and petrolatum. In some embodiments, the liquid 160 can be an ester. Examples of esters include, but are not limited to decyl oleate, decyl cocoate, dibutyl adipate, isocetyl stearate, isopropyl myristate, isopropyl palmitate, oleyl oleate, sebacate, caprillic/capric esters, and stearyl stearate. In some embodiments, the liquid 160 can be an ether, such as dioctyl ether.

In some embodiments, the liquid 160 can include a non-solvent liquid. As described herein, some examples of non-solvent liquids can include silicone oils with straight chains or cyclic chains, fluorinated liquids, such as fluorinated hydrocarbon liquids, perfluorinated hydrocarbon liquids, fluorinated perfluoropolyether (PFPE), fluorinated silicones, aryl silicones, phenyl trimethicone, cyclomethicones, aryl cyclomethicones, mineral oil, paraffin oil, C13-C14 isoparaffins, C16-C18 isoparaffins, di and triglyceride esters, and tri alkyl esters of citric acid.

In some embodiments, the liquid 160 can be immiscible with water. In some embodiments, the liquid 160 can be immiscible with certain classes of the contact liquid 190. Some of the examples of the liquid 160 that are immiscible with certain classes of the contact liquid 190 include silicone oils, fluorinated hydrocarbons, fluorinated perfluoropolyethers, fluorinated silicones, aryl silicones, phenyl trimethicone, cyclomethicones, aryl cyclomethicones and hydrocarbon liquids including mineral oil, paraffin oil, C13-C14 isoparaffins, C16-C18 isoparaffins, di and triglyceride esters, and tri alkyl esters of citric acid. In some embodiments, the liquid 160 can be miscible with certain gel forming liquids described above with reference to gel forming materials of the solid 140.

In some embodiments, the additive 180 can include polysaccharides, thermoplastic elastomers, and the like. Some examples of polysaccharides include xanthan gum, guar gum, cellulose gum, chitin, etc. Some examples of thermoplastic elastomers include styrene ethylene butylene styrene (SEBS), thermoplastics (TPU), etc. SEBS, which is good at capturing and retaining oils to form a homogeneous and elastic gel, is actually a form of thermoplastic elastomer (TPE) with styrene added. SEBS further includes polyolefin plastics such as polyethylene (PE) and polypropylene (PP).

In some embodiments, the additive 180 can include cross-linked (poly) acrylic acids such as Lubrizol carbomers. The carbomers are high molecular weight, crosslinked and (poly) acrylic acid-based polymers. In some exemplary embodiments, the additive 180 can include Lubrizol polymers containing carbomer homopolymers, such as polymers of acrylic acid crosslinked with allyl sucrose or allyl pentaerythritol, carbomer homopolymers, such as polymers of acrylic acid and a C10-C30 alkyl acrylate crosslinked with allyl pentaerythritol, carbomer interpolymers that include homopolymers and/or copolymers that contain a block copolymer or polyethylene glycol and a long chain alkyl acid ester, and polycarbophil that includes a polymer of acrylic acid crosslinked with divinyl glycol, etc. In some exemplary embodiments, the additive 180 can be made to move to the interface upon application of external stimuli such as a magnetic or electric field, change in pH, change in temperature, etc. In some exemplary embodiments, the additive 180 can move to the interface without external stimuli, yet can still be actively manipulated after they move to the interface via the same external stimuli.

In some embodiments, the contact liquids 190 are the substances and/or products for which the DLS 120 is applicable. In some embodiments, the applicable class of substances includes general products and items that are shear thinning with water or oil as the major phase. For example, in some embodiments, the contact liquid 190 can include products and substances that are usually an oil-in-water emulsion. In some embodiments, the contact liquid 190 can include a medium which is mainly water or water with dissolved polar components or nonpolar components up to a certain concentration of surfactants/emulsifiers. In some embodiments, the contact liquid 190 can be any liquid that is slightly miscible or immiscible with DLS 120 such as, for example, water, edible liquids or aqueous formulations (e.g., ketchup, mustard, mayonnaise, honey, etc.), environmental fluids (e.g., sewage, rain water), bodily fluids (e.g., urine, blood, stool), or any other fluid. In some embodiments, the contact liquid 190 can be a food product or a food ingredient such as, for example, a sticky, highly viscous, and/or non-Newtonian fluid or food product. Such food products can include, for example, candy, chocolate syrup, mash, yeast mash, beer mash, taffy, food oil, fish oil, marshmallow, dough, batter, baked goods, chewing gum, bubble gum, butter, peanut butter, jelly, jam, dough, gum, cheese, cream, cream cheese, mustard, yogurt, sour cream, curry, sauce, ajvar, currywurst sauce, salsa lizano, chutney, pebre, fish sauce, tzatziki, sriracha sauce, vegemite, chimichurri, HP sauce/brown sauce, harissa, kochujang, hoisan sauce, kim chi, cholula hot sauce, tartar sauce, tahini, hummus, shichimi, ketchup, mustard, pasta sauce, Alfredo sauce, spaghetti sauce, icing, dessert toppings, or whipped cream, liquid egg, ice cream, animal food, and any other food product or combination thereof. In some embodiments, the contact liquid 190 can include a topical or oral drug, a cream, an ointment, a lotion, an eye drop, an oral drug, an intravenous drug, an intramuscular drug, a suspension, a colloid, or any other form and can include any drug included within the FDA's database of approved drugs. In some embodiments, the contact liquid 190 can include a health and beauty product, for example, toothpaste, mouth washes, mouth creams, denture fixing compounds, any other oral hygiene product, sun screens, anti-perspirants, anti-bacterial cleansers, lotions, shampoo, conditioner, moisturizers, face washes, hair-gels, medical fluids (e.g., anti-bacterial ointments or creams), any other health or beauty product, and/or a combination thereof. In some embodiments, the contact liquid 190 can include any other non-Newtonian, thixotropic or highly viscous fluid, for example, laundry detergent, paint, caulks, sealants, adhesives, agrochemicals, oils, glues, waxes, petroleum products, fabric softeners, industrial solutions, or any other contact liquid 190.

Figure 2:
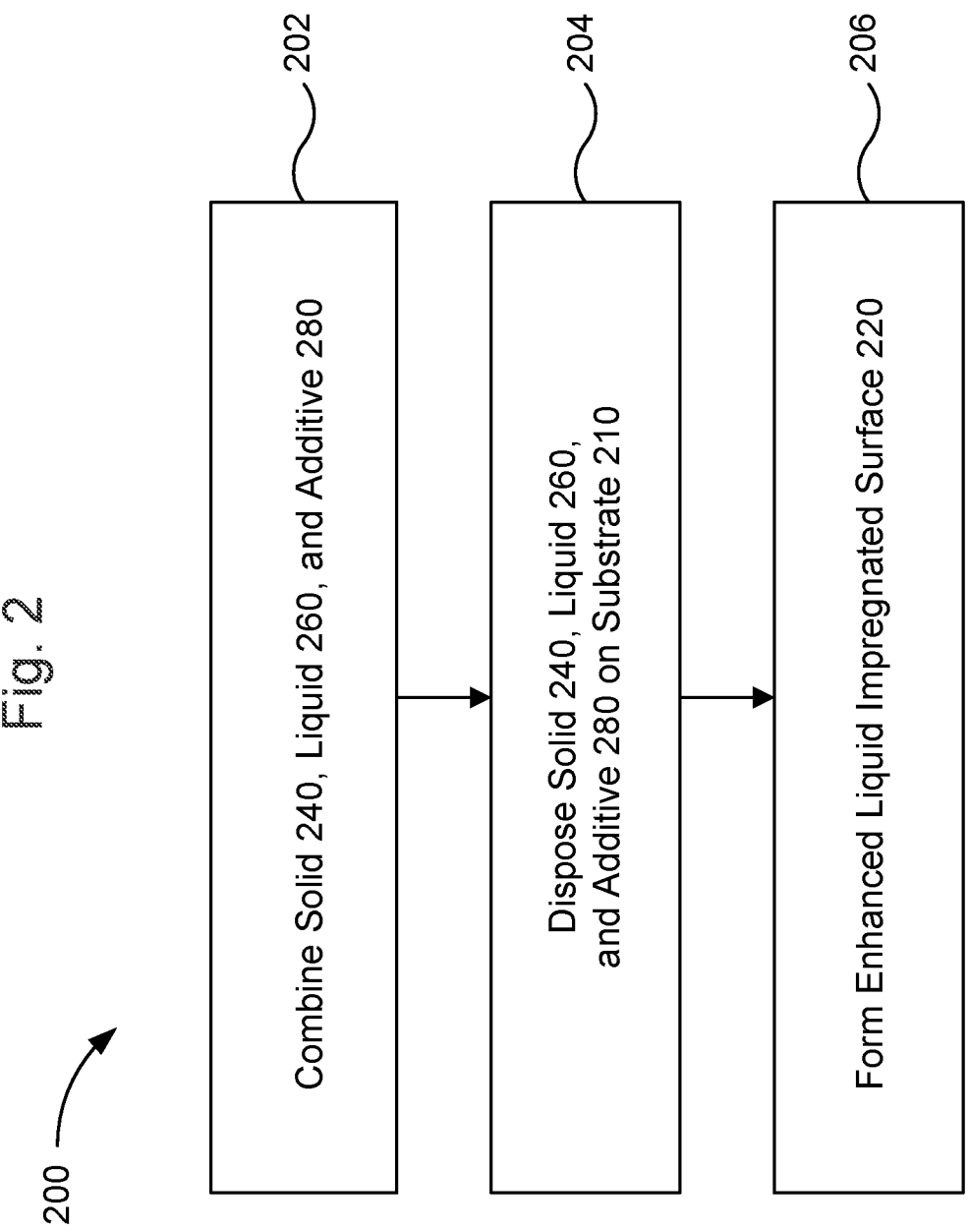
FIG. 2 shows a process flow diagram for preparing an enhanced liquid impregnated surface via a single-step approach, according to an embodiment.

FIG. 2 shows a process flow diagram describing a manufacturing method 200 for preparing an ELIS 220, according to an embodiment. The manufacturing method 200 includes combining a solid 240, a liquid 260, and an additive 280, at step 202. The solid 240 can be any of the solids 140 described above with reference to FIG. 1, the liquid 260 can be any of the liquids 160 described above with reference to FIG. 1, and the additive 280 can be any of the additive 180 described above with reference to FIG. 1. Therefore, the solid 240, the liquid 260, and the additive 280 are not described in further detail herein, and should be considered identical or substantially similar to the solid 140, the liquid 160, and the additive 180 unless explicitly described differently. In some embodiments, the solid 240, the liquid 260, and the additive 280 can be combined in a container and agitated or stirred, or any other type or form of mixing, shaking, and centrifuging. In some embodiments, the resulting mixture of the solid 240, the liquid 260, and the additive 280 can be in the form of liquid, semi-solid, slurry, gel, or paste.

Once a mixture of the solid 240, the liquid 260, and the additive 280 is produced, the mixture is disposed onto the substrate 210, at step 204. In some embodiments, the mixture can be disposed on the substrate 210 to form a substantially continuous coating. A substrate 210 can be any of the substrates 110, described above with reference to FIG. 1. Therefore, the substrate 210 is not described in further detail herein, and should be considered identical or substantially similar unless explicitly described differently. In some embodiments, the mixture of the solid 240, the liquid 260, and the additive 280 can be disposed on the substrate 210 while the substrate 210 is spinning (e.g., a spin coating process). In some embodiments, the mixture of the solid 240, the liquid 260, and the additive 280 can be condensed onto the substrate 210. In some embodiments, the mixture of the solid 240, the liquid 260, and the additive 280 can be applied by depositing the mixture of the solid 240, the liquid 260, and the additive 280 with one or more volatile liquids (e.g., via any of the previously described methods) and evaporating away the one or more volatile liquids. In some embodiments, the mixture of the solid 240, the liquid 260, and the additive 280 can be applied using a spreading (non-viscous) liquid that spreads or pushes the liquid 260 and/or the additive 280 along the surface of the substrate 210. The non-viscous flow of the combined solution traversing on the surface of the substrate 210 may distribute the mixture of the solid 240, the liquid 260, and the additive 280 uniformly across the surface of the substrate 210.

After the solid 240, the liquid 260, and the additive 280 have been disposed on the substrate 210, an ELIS 220 is formed at step 206. As described above, the ELIS 220 can include a microscopically smooth uniform ELIS 220 coating on the substrate 210. In some embodiments, the ELIS 220 coating can also be a macroscopically smooth coating. In some embodiments, the volume percentage of the ELIS 220 that is solid (solid concentration) can be within a range of 5% to 90% of solid 240 in the liquid 260, or in the range of 1% to 20% of solid in the liquid. This solid concentration can result in a very low fraction of the solid that is non-submerged by the liquid ($\phi < 2\%$).

In some embodiments, the ELIS 220 can have a coating thickness of about 1 nm to about 10 nm, about 10 nm to about 100 nm, about 100 nm to about 200 nm, about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1 µm, about 1 µm to about 5 µm, about 5 µm to about 10 µm, about 10 µm to about 50 µm, about 50 µm to about 100 µm, about 100 µm to about 200 µm, about 200 µm to about 300 µm, about 300 µm to about 400 µm, about 400 µm to about 500 µm, about 500 µm to about 600 µm, about 600 µm to about 700 µm, about 700 µm to about 800 µm, about 800 µm to about 900 µm, about 900 µm to about 1 mm, or about 1 mm to about 10 mm, and any thickness in the ranges therebetween.

Figure 3:
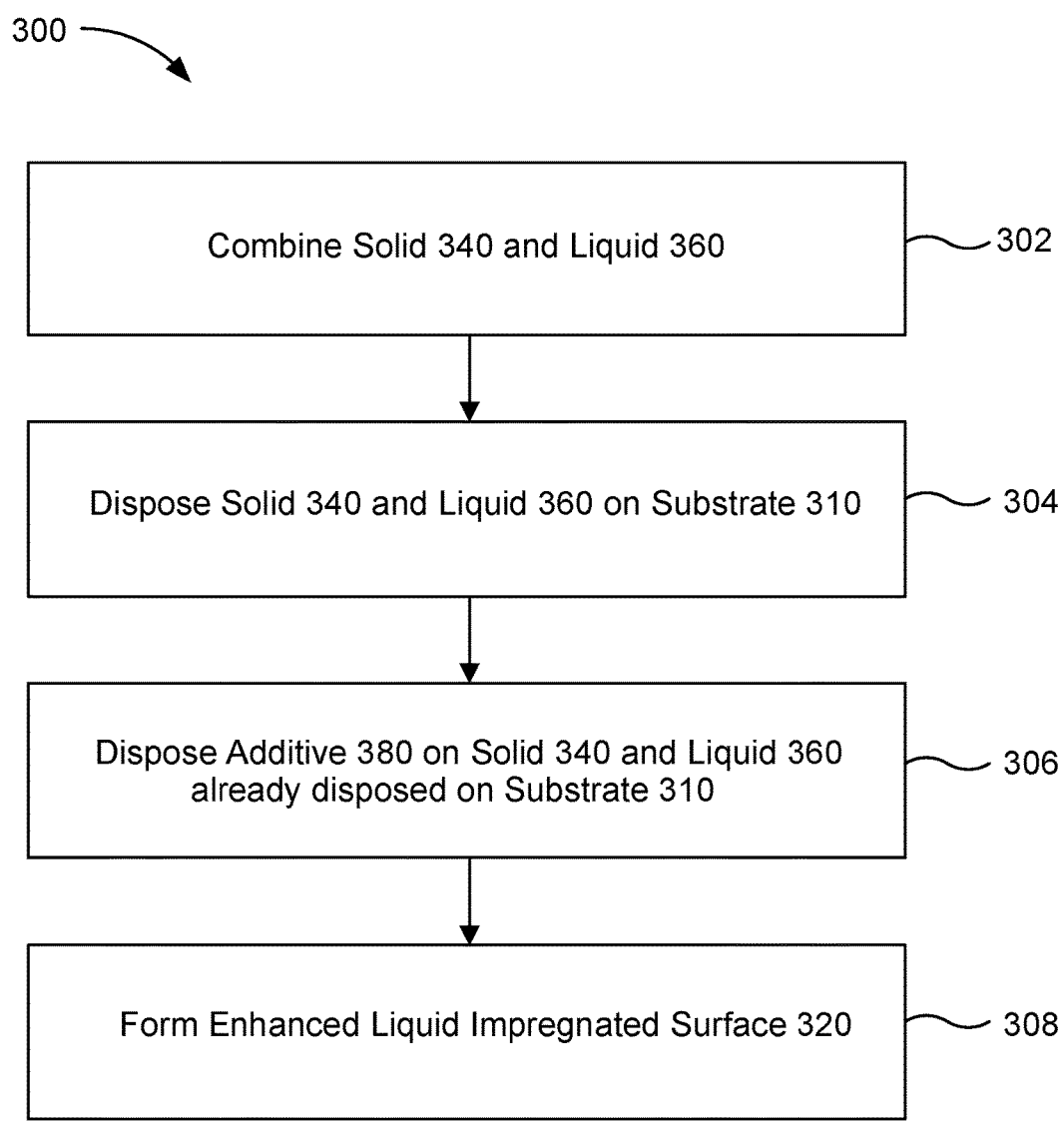
FIG. 3 shows a process flow diagram for preparing an enhanced liquid impregnated surface via a sprayed-on approach, according to an embodiment.

FIG. 3 shows a process flow diagram describing a manufacturing method 300 for preparing an ELIS 320, according to an embodiment. The manufacturing method 300 includes combining a solid 340 and a liquid 360, at step 302. The solid 340 can be any of the solids 140 described above with reference to FIG. 1 and the liquid 360 can be any of the liquids 160 described above with reference to FIG. 1. Therefore, the solid 340 and the liquid 360 are not described in further detail herein, and should be considered identical or substantially similar to the solid 140 and liquid 160 unless explicitly described differently. In some embodiments, the solid 340 and the liquid 360 can be combined in a container and agitated or stirred, or any other type or form of mixing, shaking, and centrifuging. In some embodiments, the resulting mixture of the solid 340 and the liquid 360 can be in the form of liquid, semi-solid, shiny, gel, or paste.

Once a mixture of the solid 340 and the liquid 360 is produced, the mixture is disposed onto the substrate 310, at step 304. In some embodiments, the mixture can be disposed on the substrate 310 to form a substantially continuous coating. A substrate 310 can be any of the substrates 110, described above with reference to FIG. 1. Therefore, the substrate 310 is not described in further detail herein, and should be considered identical or substantially similar unless explicitly described differently. In some embodiments, the mixture of the solid 340 and the liquid 360 can be disposed on the substrate 310 while the substrate 310 is spinning (e.g., a spin coating process). In some embodiments, the mixture of the solid 340 and the liquid 360 can be condensed onto the substrate 310. In some embodiments, the mixture of the solid 340 and the liquid 360 can be applied by depositing the mixture of the solid 340 and the liquid 360 with one or more volatile liquids (e.g., via any of the previously described methods) and evaporating away the one or more volatile liquids. In some embodiments, the mixture of the solid 340 and the liquid 360 can be applied using a spreading, low viscosity liquid that spreads or pushes the liquid 360 along the surface of the substrate 310. The non-viscous flow of the combined solution traversing on the surface of the substrate 310 may distribute the mixture of the solid 340 and the liquid 360 uniformly across the surface of the substrate 310.

After the solid 340 and the liquid 360 are disposed on the substrate 310 forming a liquid impregnated surface, an additive 380 can be disposed onto the previously disposed liquid impregnated surface comprising the mixture of the solid 340 and the liquid 360, at step 306. As described herein, the additive 380 can be any of the additive 180 described above with reference to FIG. 1. Therefore, the additive 380 is not described in further detail herein, and should be considered identical or substantially similar unless explicitly described differently.

After the additive 380 has been disposed onto the previously deposited liquid impregnated surface comprising the solid 340 and the liquid 360 on the substrate 310, an ELIS 320 is formed at step 308. As described above, the ELIS 320 can include the additive 380 disposed on the liquid impregnated surface comprising the solid 340 and the liquid 360, which can be a microscopically smooth uniform ELIS 320 coating on the substrate 310. In some embodiments, the ELIS 320 coating can also be a macroscopically smooth coating. In some embodiments, the ELIS 320 coating can appear as particles sprinkled onto a liquid impregnated surface. The method of disposing the additive 380 can be any method or processes that have been described herein and in various referenced applications incorporated by reference herein. In some embodiments, the average solid concentration of the ELIS 320 can be within a range of 5% to 90% of solid 340 in the liquid 360. This solid concentration can result in a very low portion of the solid that is non-submerged by the liquid ($\phi < 2\%$).

In some embodiments, the ELIS 320 can have a coating thickness of about 1 nm to about 10 nm, about 10 nm to about 100 nm, about 100 nm to about 200 nm, about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1 µm, about 1 µm to about 5 µm, about 5 µm to about 10 µm, about 10 µm to about 50 µm, about 50 µm to about 100 µm, about 100 µm to about 200 µm, about 200 µm to about 300 µm, about 300 µm to about 400 µm, about 400 µm to about 500 µm, about 500 µm to about 600 µm, about 600 µm to about 700 µm, about 700 µm to about 800 µm, about 800 µm to about 900 µm, about 900 µm to about 1 mm, or about 1 mm to about 10 mm, and any thickness in the ranges therebetween.

Figure 4A:
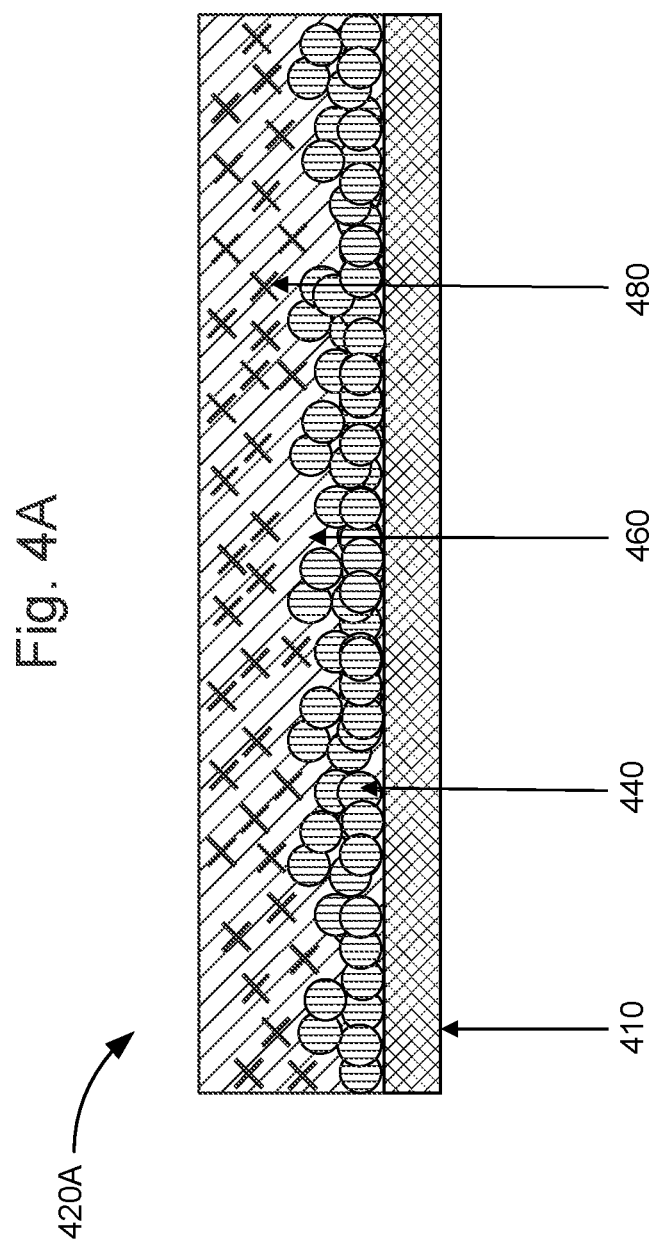
FIG. 4A shows an illustration of a cross-section of a substrate with a liquid impregnated surface and an additive, according to an embodiment.

FIG. 4A is a schematic illustration of a cross-section of a liquid impregnated surface 420A and an additive 480 disposed on a substrate 410. As depicted in FIG. 4A, the liquid impregnated surface 420A includes a solid 440, an impregnating liquid 460, and the additive 480 dispersed in the impregnating liquid 460. As shown, the additive 480 comprises a plurality of particles randomly distributed throughout the impregnating liquid 460. In some embodiments, the liquid impregnates surface 420A having the additive 480 disposed in the impregnating liquid 460 can be produced by the manufacturing method 200 as described above with reference to FIG. 2. In some embodiments, the liquid impregnated surface 420A having the additive 480 disposed in the impregnating liquid 460 can be produced by the manufacturing method 300 as described above with reference to FIG. 3.

In some embodiments, such as those depicted in FIGS. 4A, 4B and 7, there is excess impregnating liquid that is mobile over and above the solid features. The mobile excess liquid can drain over time until the thickness of the liquid impregnated surface is equal or less than the dimension of the solid particles, aggregates of solid particles, or the peak height of surface features, at which point the liquid would be stabilized by capillary forces in a configuration similar to that depicted in FIGS. 4C, 8 and 9. In such cases, phi can be non-zero.

As described herein, the substrate 410 can be any of the substrates 110 described above with reference to FIG. 1. The substrate 410 can be formed entirely or partially from any of the substrates 110. The surface features on the substrate 410 can be substantially similar to the surface features described in reference to the substrate 110. Therefore, the substrate 410 is not described in further detail herein and should be considered substantially similar unless explicitly described differently. Similarly, the solid 440 can be substantially similar to the solid 140 as described in reference to FIG. 1, and hence, is not described in further detail herein and should be considered substantially similar unless explicitly described differently. Likewise, the impregnating liquid 460 can be substantially similar to the liquid 160 as described in reference to FIG. 1, and hence, is not described in further detail herein and should be considered substantially similar unless explicitly described differently. In addition, the additive 480 can be substantially similar to the additive 180 as described in reference to FIG. 1, and hence, is not described in further detail herein and should be considered substantially similar unless explicitly described differently.

FIG. 4B is a schematic illustration of a cross-section of an ELIS 420B after a contact liquid 490 is disposed onto the liquid impregnated surface 420A. As depicted in FIG. 4B, the randomly distributed additive 480 particles have migrated to the interface with the contact liquid 490 to form an interfacial layer 485. In some embodiments, the interfacial layer 485 covers the entire interface between the contact liquid 490 and the ELIS 420B. In some embodiments, the interfacial layer 485 substantially covers the interface between the contact liquid 490 and the ELIS 420B. In some embodiments, the interfacial layer 485 covers a majority of the interface between the contact liquid 490 and the ELIS 420B. In some embodiments, the interfacial layer 485 covers a portion of the interface between the contact liquid 490 and the ELIS 420B.

In some embodiments, the interfacial layer 485 can be one monolayer in thickness between the contact liquid 490 and the ELIS 420B. In some embodiments, the interfacial layer 485 can be a few monolayers in thickness between the contact liquid 490 and the ELIS 420B. In some embodiments, the interfacial layer 485 can be several monolayers in thickness between the contact liquid 490 and the ELIS 420B.

In some embodiments, the interfacial layer 485 can have a thickness of 0.1 nm, 0.2 nm, 0.3 nm, 0.4 nm, 0.5 nm, 0.6 nm, 0.7 nm, 0.8 nm, 0.9 nm, 1.0 nm, 1.1 nm, 1.2 nm, 1.3 nm, 1.4 nm, 1.5 nm, 1.6 nm, 1.7 nm, 1.8 nm, 1.9 nm, 2.0 nm, 2.2 nm, 2.4 nm, 2.6 nm, 2.8 nm, 3.0 nm, 4.0 nm, 5.0 nm, 6.0 nm, 7.0 nm, 8.0 nm, 9.0 nm, 10 nm, 11 nm, 12 nm, 13 nm, 14 nm, 15 nm, 16 nm, 17 nm, 18 nm, 19 nm, 20 nm, 22 nm, 24 nm, 26 nm, 28 nm, 30 nm, 32 nm, 34 nm, 36 nm, 38 nm, 40 nm, 45 nm, 50 nm, 55 nm, 60 nm, 65 nm, 70 nm, 75 nm, 80 nm, 85 nm, 90 nm, 95 nm, or 100 nm, 1 µm, 10 µm, 50 µm, 500 µm, 1 mm, 2 mm, 5 mm, inclusive of all thicknesses therebetween.

FIG. 5 is a schematic illustration of a cross-section of a DLS 520, comprising a substrate 510, a lubricious liquid 560 disposed on the substrate 510, a contact liquid 590 (i.e., product), and an interfacial modifier additive 580 at least partially disposed in the lubricous liquid 560. As described herein, the interfacial modifier additive 580 is formulated to migrate away from the substrate 510 and form a secondary contacting phase at the interface 585 between the lubricious liquid 560 and the contact liquid 590. In some embodiments, the interfacial modifier additive 580 is mixed in with the lubricious liquid 560 and then migrates through the lubricious liquid 560 to form the interface 585 when the lubricious liquid 560 comes in contact with the contact liquid 590. In some embodiments, the lubricious liquid 560 is first disposed on the substrate 510 and the interfacial modifier additive 580 is then disposed on the surface of the lubricious liquid 560. The partition coefficient of the interfacial modified additive 580 is sufficient to maintain substantial micellization and dissolving of the interfacial modifier additive 580 from the lubricious liquid 560.

FIG. 6 is a schematic illustration of a cross-section of a DLS 620, comprising a substrate 620, a lubricious liquid 660 disposed on the substrate 610, a contact liquid 690 (i.e., product), an interfacial modifier additive 680 at least partially disposed in the lubricious liquid 660, and a rheological modifier additive 670 disposed in the lubricious liquid. In some embodiments, the theological modifier additive 670 is disposed in the lubricious liquid 660 and the mixture is disposed on the substrate 610, such that the rheological modifier additive 670 remains substantially homogenously distributed throughout the lubricous liquid 660. In some embodiments, the theological modifier additive 670 and interfacial modifier additive 680 are both disposed in the lubricious liquid 660 and the mixture is disposed on the substrate 610, such that the rheological modifier additive 670 remains substantially homogenously distributed throughout the lubricous liquid 660 while the interfacial modifier additive 680 migrates to the interface 685 between the rheologically modified lubricious layer 660 and the contact liquid 690, forming a substantially immiscible contacting phase. In some embodiments, the rheological modifier additive 670 is disposed in the lubricious liquid 660 and the mixture is disposed on the substrate 610, such that the rheological modifier additive 670 remains substantially homogenously distributed throughout the lubricous liquid 660 and then the interfacial modifier additive 680 is disposed on the surface of the rheologically modified lubricious layer 660. In some embodiments, the pathways chosen for disposition of the rheological modifier additive 670 and interfacial modifier additive 680 to the lubricious liquid 660 and the interface 685 between the rheologically modified lubricious liquid 660 layer and the contacting liquid 690, respectively, do not affect the enhancement of durability and lubricity for the lubricous surface 620.

FIG. 7 is a schematic illustration of a cross-section of a DLS 720, comprising a substrate 710, a plurality of solid features 740 coupled to the substrate 710, a lubricious liquid 760 disposed on the plurality of solid features 740, a contact liquid 790 (i.e., product), and an interfacial modifier additive 780 at least partially disposed in the lubricous liquid 760. The interfacial modifier additive 780 can be substantially similar to the interfacial modifier additive 580 described above with respect to FIG. 5 and thus is not descried in further detail herein. The solid features 740 and the lubricious liquid 760 collectively form a liquid impregnated surface that is "enhanced" by the presence of the interfacial modifier additive 780 as described herein.

FIG. 8 is a schematic illustration of a cross-section of a DLS 820, comprising a substrate 810, a plurality of solid features 840 disposed on the substrate 810, a lubricious liquid 860 disposed on the plurality of solid features 840, a contact liquid 890 (i.e., product), and an interfacial modifier additive 880 at least partially disposed in the lubricous liquid 860. The interfacial modifier additive 880 can be substantially similar to the interfacial modifier additive 580 described above with respect to FIG. 5 and thus is not descried in further detail herein. The solid features 840 and the lubricious liquid 860 collectively form a liquid impregnated surface that is "enhanced" by the presence of the interfacial modifier additive 880 as described herein. Unlike the DLS 720 described above with respect to FIG. 7 where the plurality of solid features 740 are physically coupled to the substrate 710, the plurality of solid features 840 are "mobile" with respect to the substrate 810.

FIG. 9 is a schematic illustration of a cross-section of a DLS 920, including a substrate 910, a plurality of solid features 940 coupled to the substrate 910, a lubricious liquid 960 disposed on the plurality of solid features 940, a contact liquid 990 (i.e., product), and an interfacial modifier additive 980 at least partially disposed in the lubricous liquid 960. The interfacial modifier additive 980 can be substantially similar to the interfacial modifier additive 580 described above with respect to FIG. 5 and thus is not descried in further detail herein. The solid features 940 and the lubricious liquid 960 collectively form a liquid impregnated surface that is "enhanced" by the presence of the interfacial modifier additive 980 as described herein. In some embodiments, the lubricious liquid 960 does not completely fill the interstitial regions either by design, due to depletion, or due to movement, loss or degradation of solid features. In some embodiments, the incomplete impregnation of interstitial regions forms a liquid-impregnated surface for which the interfacial modifier additive 980 can provide protection against impingement which can reduce the need for replenishment of the lubricious liquid 960. In some embodiments, the interfacial modifier additive 980 can reduce the decline in lubricity due to increased contact between solid features and contact liquid 990 and due to the lubricious liquid 960 loss. In some embodiments, the interfacial modifier additive 980 can reduce the contamination of contact liquid 990 (i.e., product) with the lubricious liquid 960 in embodiments for which such mixing is undesirable.

Figure 10A:
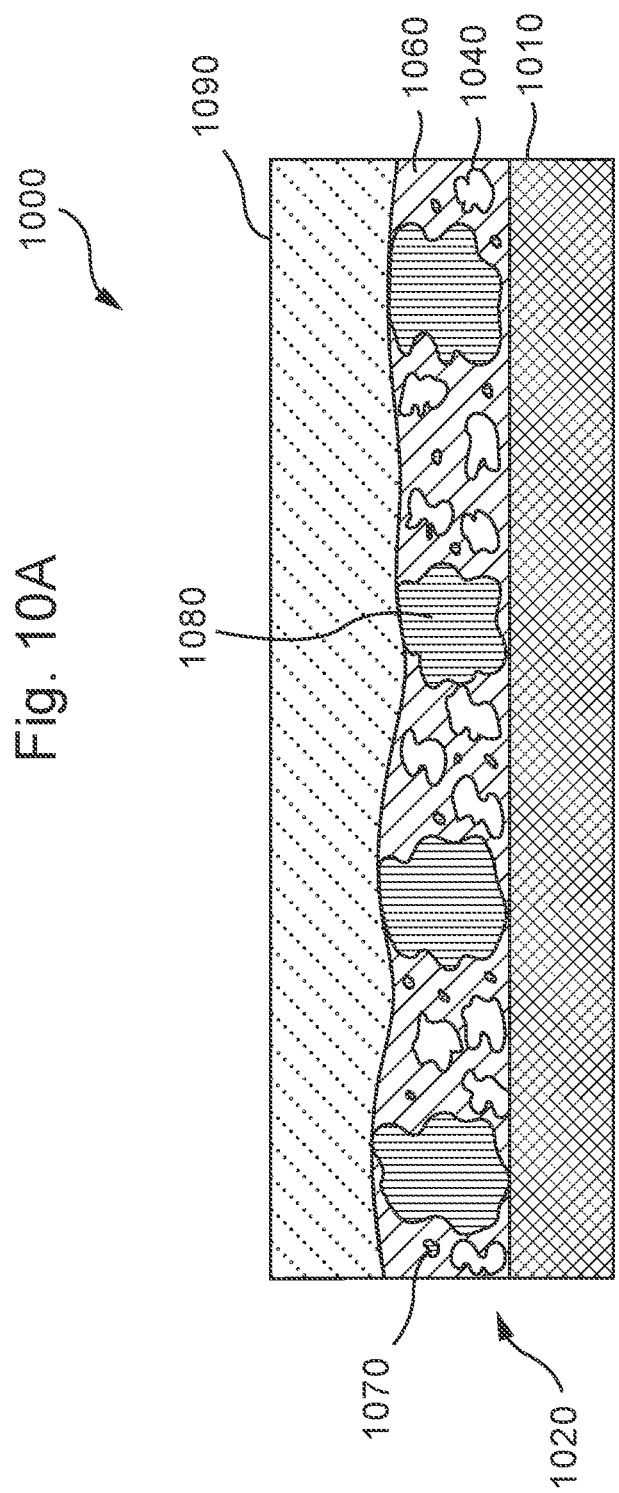
FIG. 10A shows an illustration of a cross-section of a durable lubricious surface comprising a liquid-impregnated surface and an interfacial modifier additive, according to an embodiments.
Figure 10B:
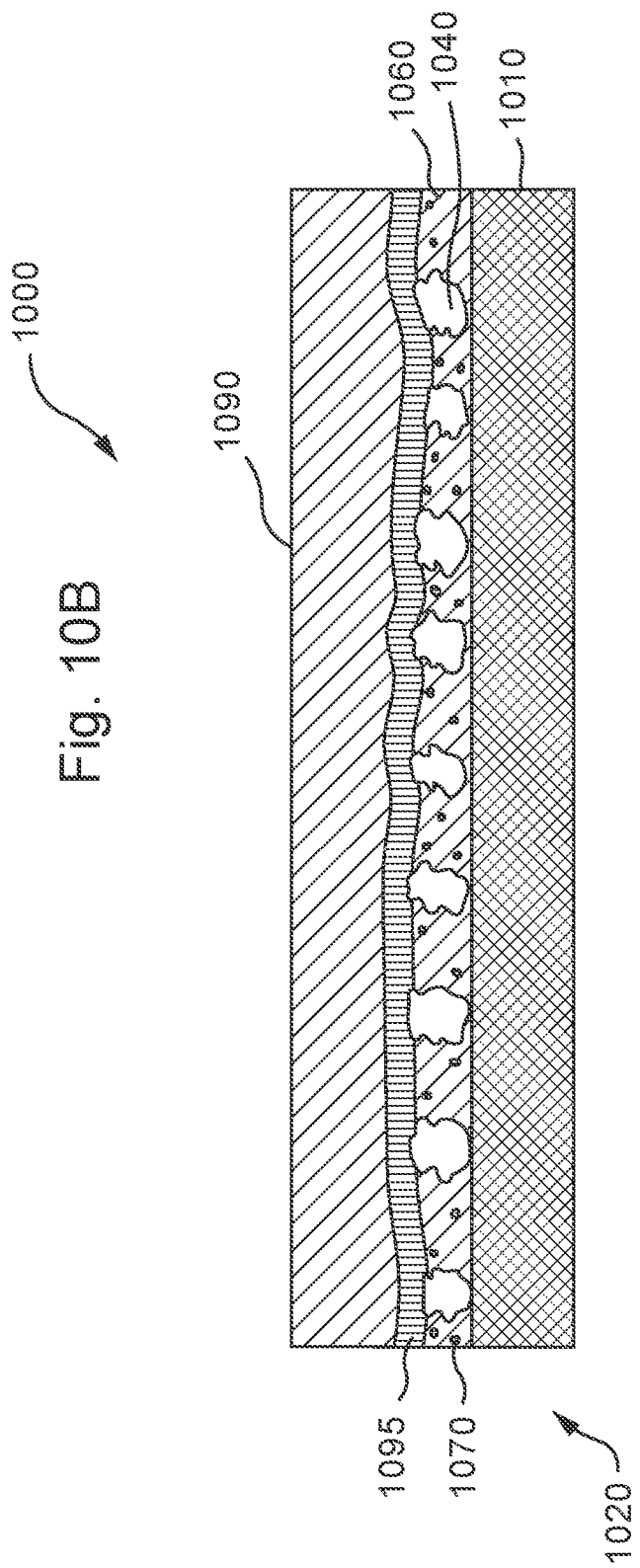
FIG. 10B shows an illustration comprising the liquid-impregnated surface of FIG. 10A after at least a portion of the interfacial modifier additive migrates into a product phase.

FIGS. 10A and 10B are schematic illustrations of a durable lubricious surface 1000 including a substrate 1010, a lubricious surface coating 1020 including a plurality of particles 1040, a rheological modifier 1070, and an interfacial modifier 1080 in a liquid 1060. The lubricious surface coating 1020 is configured to be disposed adjacent to a contact liquid 1090 (i.e., product, contact phase, or contacting liquid). In some embodiments, the plurality of particles 1040 can be different from the rheological modifier 1070 and the interfacial modifier 1080. The durable lubricious surface 1000 has a first configuration (e.g., as shown in FIG. 10A) in which the interfacial modifier 1080 is included in the liquid 1060 and a second configuration (e.g., as shown in FIG. 10B) in which at least a portion of the interfacial modifier 1080 has migrated into the contact liquid 1090.

In some embodiments, the substrate 1010 includes at least one of a flat surface, a contoured surface, an inner surface, a bumpy surface, a smooth surface, a surface textured with regular periodic patters, a surface textured with random shapes and contours, or combinations thereof. In some embodiments, the substrate is a surface of at least one of a tube, a bottle, a vial, a flask, a mold, a jar, a tub, a cup, a cap, a glass, a pitcher, a barrel, a bin, a tote, a tank, a keg, a tub, a syringe, a tin, a pouch, a lined box, a hose, a cylinder, a can, a hose, a pipe, a conduit, a nozzle, a syringe needle, a dispensing tip, a lid, a pump, and combinations thereof.

In some embodiments, the liquid 1060 and the interfacial modifier 1080 can be configured such that the liquid 1060 repels the interfacial modifier 1080. In some embodiments, the contact liquid 1090 can be configured to attract the interfacial modifier 1080. In some embodiments, the liquid 1060 can be immiscible with the contact liquid 1090. In some embodiments, the liquid 1060 remains liquid during use of the article 1000. In some embodiments, the liquid 1060 remains liquid during more than one month of use of the durable lubricious surface 1000, more than about six months, more than about one year, more than about three years, more than about five years, more than about ten years, or greater.

In some embodiments, the plurality of particles 1040 have an average dimension between about 100 nm and about 100 μm, about 500 nm and about 95 μm, about 1 μm and about 90 μm, about 2 μm and about 85 μm, about 3 μm and about 80 μm, about 4 μm and about 75 μm, about 5 μm and about 70 μm, about 6 μm and about 65 μm, about 7 μm and about 60 μm, about 8 μm and about 55 μm, about 9 μm and about 50 μm, about 10 μm and about 45 μm, about 5 μm and about 40 μm, about 10 μm and about 50 μm, about 20 μm and about 50 μm, about 25 μm and about 50 μm, about 30 μm and about 50 μm, inclusive of all values and ranges therebetween. In some embodiments, the plurality of particles 1040 have an average dimension greater than about 50 nm, greater than about 100 nm, greater than about 250 nm, greater than about 500 nm, greater than about 750 nm, greater than about 1 μm, greater than about 2 μm, greater than about 3 μm, greater than about 4 μm, greater than about 5 μm, greater than about 6 μm, greater than about 7 μm, greater than about 8 μm, greater than about 9 μm, greater than about 10 μm, greater than about 11 μm, greater than about 12 μm, greater than about 13 μm, greater than about 14 μm, greater than about 15 μm, greater than about 16 μm, greater than about 17 μm, greater than about 18 μm, greater than about 19 μm, greater than about 20 μm, greater than about 25 μm, greater than about 30 μm, greater than about 35 μm, greater than about 40 μm, greater than about 45 μm, greater than about 50 μm, greater than about 55 μm, greater than about 60 μm, greater than about 65 μm, greater than about 70 μm, greater than about 75 μm, greater than about 80 μm, greater than about 85 μm, greater than about 90 μm, greater than about 95 μm, or greater than about 100 μm, inclusive of all values and ranges therebetween.

In some embodiments, the liquid 1060 disposed on the substrate 1010 has an average thickness, and the average dimension of the plurality of particles 1040 is greater than or equal to the average thickness of the liquid 1060. In some embodiments, the liquid 1060 disposed on the substrate

1010 has an average thickness that is greater than or equal to the average dimension of the plurality of particles 1040. In some embodiments, the average dimension of the plurality of particles 1040 is less than about 3 times the average thickness of the liquid 1060 on the substrate 1010, less than about 2.5 times, less than about 2 times, less than about 1.9 times, less than about 1.8 times, less than about 1.7 times, less than about 1.6 times, less than about 1.5 times, less than about 1.4 times, less than about 1.3 times, less than about 1.2 times, less than about 1.1 times, or equal to the thickness of the liquid 1060 on the substrate 1010.

In some embodiments, the avenge thickness of the liquid 1060 disposed on the substrate 1010 is between about 100 nm and about 100 µm, about 500 nm and about 95 µm, about 1 µm and about 90 µm, about 2 µm and about 85 µm, about 3 µm and about 80 µm, about 4 µm and about 75 µm, about 5 µm and about 70 µm, about 6 µm and about 65 µm, about 7 µm and about 60 µm, about 8 µm and about 55 µm, about 9 µm and about 50 µm, about 10 µm and about 45 µm, about 10 µm and about 40 µm, about 20 µm and about 50 µm, about 25 µm and about 50 µm, about 30 µm and about 50 µm, inclusive of all values and ranges therebetween. In some embodiments, the average thickness of the liquid 1060 disposed on the substrate 1010 is greater than about 50 nm, greater than about 100 nm, greater than about 250 nm, greater than about 500 nm, greater than about 750 nm, greater than about 1 µm, greater than about 2 µm, greater than about 3 µm, greater than about 4 µm, greater than about 5 µm, greater than about 6 µm, greater than about 7 µm, greater than about 8 µm, greater than about 9 µm, greater than about 10 µm, greater than about 11 µm, greater than about 12 µm, greater than about 13 µm, greater than about 14 µm, greater than about 15 µm, greater than about 16 µm, greater than about 17 µm, greater than about 18 µm, greater than about 19 µm, greater than about 20 µm, greater than about 25 µm, greater than about 30 µm, greater than about 35 µm, greater than about 40 µm, greater than about 45 µm, greater than about 50 µm, greater than about 55 µm, greater than about 60 µm, greater than about 65 µm, greater than about 70 µm, greater than about 75 greater than about 80 µm, greater than about 85 µm, greater than about 90 µm, greater than about 95 µm, or greater than about 100 µm, inclusive of all values and ranges therebetween.

In some embodiments, the liquid 1060 includes at least one of a silicone oil, a fluorinated hydrocarbon, a fluorinated perfluoropolyether, a hydrocarbon liquid, a vegetable oil, a vegetable oil derivative, a triglyceride, a fatty acid, an ester, an ethyl oleate, an FDA approval liquid food additive, and combinations thereof.

In some embodiments, the contact liquid 1090 (also known as "the contacting phase", "the contact liquid", and/or "the product") can include any suitable fluid, including but not limited to yield stress fluids, non-Newtonian fluids, Bingham plastics, and thixotropic fluids. In some embodiments, the contact liquid 1090 can include at least one of toothpaste, mouth wash, a mouth cream, a denture fixing compound, sun screen, an antiperspirant, an antibacterial cleanser, a lotion, shampoo, conditioner, a moisturizer, face wash, hair-gel, a medical fluid, an anti-bacterial ointment, an anti-bacterial cream, laundry detergent, paint, caulk, a sealant, an adhesive, an agrochemical, an oil, a glue, a wax, a petroleum product, a fabric softener, an industrial solution, ketchup, catsup, mustard, mayonnaise, syrup, honey, jelly, peanut butter, butter, chocolate syrup, shortening, margarine, oleo, grease, dip, yogurt, sour cream, cosmetics, and combinations thereof.

In some embodiments, the plurality of particles 1040 can include at least one of insoluble fibers, purified wood cellulose, micro-crystalline cellulose, oat bran fiber, wax, carnauba wax, Japan wax, beeswax, candelilla wax, fructo-oligosaccharides, a metal oxide, montan wax, lignite and peat, ozokerite, ceresins, bitumens, petrolatuns, paraffins, microcrystalline wax, lanolin, an ester of metal or alkali, flour of coconut, almond, potato, wheat, pulp, zein, dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, ferric oxide, ferrous oxide, silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether (PFPE), polychlorotetrafluoroethylene (PCTFE), polyvinyl alcohol (PVA), polyethyleneglycol (PEG), tecnoflon cellulose acetate, poly(acrylic acid), poly(propylene oxide), D-sorbitol, polycarbonate, a styrenic block copolymer, polystyrene-b-poly(ethylene/propylene), polystyrene-b-poly(ethylene/propylene)-b-polystyrene, polystyrene-b-poly(ethylene/butylene)-b-polystyrene, polystyrene-b-poly(ethylene-ethylene/propylene)-b-polystyrene, styrene-isoprene-styrene, a poly-olefin based thermoplastic elastomer, an ethylene-propylene random copolymer (EPM), a hydrogenated polybutadiene-isoprene-butadiene block copolymer, a polyamide based thermoplastic elastomer, polyesteramide (PEA), polyetheresteramide (PEEA), polycarbonate esteramide (PCEA), polyether-block-amide (PE-b-A), a polyacrylate based thermoplastic elastomer, poly(MMA-b-tBA-MMA), poly(MMA-b-alkyl acrylate-MMA), a mineral oil, a paraffin oil, a C13-C14 isoparaffin, a C16-C18 isoparaffin, a diglyceride ester, a triglyceride ester, a tri alkyl ester of citric acid, a glycerol diester, a glycerol triester, an ester of myristate, an adipate, a sebacate, and combinations thereof.

In some embodiments, the interfacial modifier 1080 can include at least one of insoluble fibers, purified wood cellulose, micro-crystalline cellulose, oat bran fiber, wax, carnauba wax, Japan wax, beeswax, candelilla wax, fructo-oligosaccharides, a metal oxide, montan wax, lignite and peat, ozokerite, ceresins, bitumens, petrolatuns, paraffins, microcrystalline wax, lanolin, an ester of metal or alkali, flour of coconut, almond, potato, wheat, pulp, zein, dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, ferric oxide, ferrous oxide, silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether(PFPE), polychlorotetrafluoroethylene (PCTFE), polyvinyl alcohol (PVA), polyethyleneglycol (PEG), tecnoflon cellulose acetate, poly(acrylic acid), poly(propylene oxide), D-sorbitol, polycarbonate, a styrenic block copolymer, polystyrene-b-poly(ethylene/propylene), polystyrene-b-poly(ethylene/propylene)-b-polystyrene, polystyrene-b-poly(ethylene/butylene)-b-polystyrene, polystyrene-b-poly(ethylene-ethylene/propylene)-b-polystyrene, styrene-isoprene-styrene, a poly-olefin based thermoplastic elastomer, an ethylene-propylene random copolymer (EPM), a hydrogenated polybutadiene-isoprene-butadiene block copolymer, a polyamide based thermoplastic elastomer, polyesteramide (PEA), polyetheresteramide (PEEA), polycarbonate esteramide (PCEA), polyether-block-amide (PE-b-A), a polyacrylate based thermoplastic elastomer, poly(MMA-b-tBA-MMA), poly(MMA-b-alkyl acrylate-MMA), a mineral oil, a paraffin oil, a C13-C14 isoparaffin, a C16-C18 isoparaffin, a diglyceride ester, a triglyceride ester, a tri alkyl ester of citric acid, a glycerol diester, a glycerol triester, an ester of myristate, an adipate, a sebacate, and combinations thereof.

In some embodiments, the plurality of particles 1040 can be hydrophobic while the interfacial modifier 1080 can be hydrophilic. In some embodiments, the plurality of particles 1040 can be hydrophilic while the interfacial modifier 1080 can be hydrophobic. In some embodiments, the plurality of particles 1040 can be oleophilic while the interfacial modifier 1080 can be oleophobic. In some embodiments, the plurality of particles 1040 can be oleophobic while the interfacial modifier 1080 can be oleophilic.

In some embodiments, the interfacial modifier 1080 can have an initial average dimension in the first configuration and a different average dimension in the second configuration. In some embodiments, the interfacial modifier 1080 can be in the form of particles in the liquid 1060 in the first configuration. In some embodiments, the particles of interfacial modifier 1080 can have an average dimension of between about 500 nm and about 500 μm, about 750 nm and about 250 μm, about 1 μm and about 100 μm, about 2 μm and about 95 μm, about 3 μm and about 90 μm, about 4 μm and about 85 μm, about 5 μm and about 80 μm, about 6 μm and about 75 μm, about 7 μm and about 70 μm, about 8 μm and about 65 μm, about 9 μm and about 60 μm, about 10 μm and about 55 μm, about 10 μm and about 50 μm, about 15 μm and about 90 μm, about 20 μm and about 85 μm, about 25 μm and about 80 μm, about 30 μm and about 80 μm, about 30 μm and about 100 μm, about 10 and about 70 μm, or about 10 μm and about 30 μm, inclusive of all values and ranges therebetween. In some embodiments, the particles of interfacial modifier 1080 can have an average dimension greater than about 500 nm, greater than about 750 nm, greater than about 1,000 nm, greater than about 1 μm, greater than about 2 μm, greater than about 3 μm, greater than about 4 μm, greater than about 5 μm, greater than about 6 μm, greater than about 7 μm, greater than about 8 μm, greater than about 9 μm, greater than about 10 μm, greater than about 11 μm, greater than about 12 μm, greater than about 13 μm, greater than about 14 μm, greater than about 15 μm, greater than about 20 μm, greater than about 25 μm, greater than about 30 μm, greater than about 35 μm, greater than about 40 μm, greater than about 45 μm, greater than about 50 μm, greater than about 55 μm, greater than about 60 μm, greater than about 65 μm, greater than about 70 μm, greater than about 75, greater than about 80 μm, greater than about 85 μm, greater than about 90 μm, greater than about 95 μm, greater than about 100 μm, or greater than about 250 μm, inclusive of all values and ranges therebetween.

In some embodiments, the interfacial modifier 1080 can be in the liquid 1060 in the first configuration and in the contact liquid 1090 in the second configuration. In some embodiments, the interfacial modifier 1080 can be configured such that at least a portion of the interfacial modifier 1080 migrates from the liquid 1060 into the contact liquid 1090 when the lubricous surface coating 1020 is applied to the substrate 1010. In some embodiments, the interfacial modifier 1080 can be configured such that substantially all of the interfacial modifier 1080 migrates from the liquid 1060 into the contact liquid 1090 when at least a portion of the lubricous surface coating 1020 is in contact with the contact liquid 1090. In some embodiments, greater than about 10 wt % of the interfacial modifier 1080 migrates into the contact liquid 1090, greater than about 15 wt %, greater than about 20 wt %, greater than about 25 wt %, greater than about 30 wt %, greater than about 35 wt %, greater than about 40 wt %, greater than about 45 wt %, greater than about 50 wt %, greater than about 55 wt %, greater than about 60 wt %, greater than about 65 wt %, greater than about 70 wt %, greater than about 75 wt %, or greater than about 80 wt %, inclusive of all values and ranges therebetween. In some embodiments, the migration of at least a portion of the interfacial modifier 1080 into the contact liquid 1090 can cause greater than about 1 t % reduction in the concentration of the interfacial modifier 1080 in the liquid 1060 after a time period, greater than about 2%, greater than about 3%, greater than about 4%, greater than about 5%, greater than about 10%, greater than about 15%, greater than about 20%, greater than about 25%, greater than about 30%, greater than about 35%, greater than about 40%, greater than about 45%, greater than about 50%, greater than about 55%, greater than about 60%, greater than about 65%, greater than about 70%, greater than about 75%, greater than about 80%, greater than about 85%, greater than about 90%, greater than about 95%, or greater than about 99%, inclusive of all values and ranges therebetween.

In some embodiments, the interfacial modifier 1080 is configured to migrate from the liquid 1060 to the contact liquid 1090 within about 1 minute after application of the lubricious surface coating 1020 to the substrate 1010, within about 2 minutes, within about 3 minutes, within about 4 minutes, within about 5 minutes, within about 6 minutes, within about 7 minutes, within about 8 minutes, within about 9 minutes, within about 10 minutes, within about 11 minutes, within about 12 minutes, within about 13 minutes, within about 14 minutes, within about 15 minutes, within about 20 minutes, within about 25 minutes, within about 30 minutes, within about 35 minutes, within about 40 minutes, within about 45 minutes, within about 50 minutes, within about 55 minutes, within about 60 minutes, within about 65 minutes, within about 70 minutes, within about 75 minutes, within about 80 minutes, within about 85 minutes, within about 90 minutes, within about 95 minutes, within about 100 minutes, within about 110 minutes, within about 120 minutes, within about 130 minutes, within about 140 minutes, within about 150 minutes, within about 160 minutes, within about 170 minutes, within about 180 minutes, within about 190 minutes, within about 200 minutes, within about 250 minutes, or within about 500 minutes, inclusive of all values and ranges therebetween.

In some embodiments, the interfacial modifier 1080 can include a material that enables crosslinking with the contact liquid 1090 by hydrogen bonding, physical crosslinking, other mechanisms, or combinations thereof.

In some embodiments, the interfacial modifier 1080 can include any material described herein, for example at least one of a polysaccharide, a thermoplastic elastomer, a crosslinking polyacrylic acid, a waxy solid, or combinations thereof. In some embodiments, the interfacial modifier can include at least one of xanthan gum, guar gum, cellulose gum, chitin, styrene ethylene butylene styrene, polyethylene, polypropylene, sodium polyacrylate, polycarbophil, a carbomer, Lubrizol carbomer, calcium polyacrylate, carnauba wax, candelilla wax, beeswax, a silicone wax, a hydrocarbon wax, a perfluoropolyether grease, and combinations thereof.

The partition coefficient describes the rate and extent of separation of two liquids initially in solution that are not completely miscible either with the other. In some embodiments, the partition coefficient of the interfacial modifier 1080 with the liquid 1060 is less than about 1, 0.95, 0.90, 0.85, 0.80, 0.75, 0.70, 0.65, 0.60, 0.55, 0.50, 0.45, 0.40, 0.35, 0.30, 0.25, 0.20, 0.15, 0.10, 0.05, 0.01, or 0.001, inclusive of all values and ranges therebetween.

In some embodiments, at least some of the interfacial modifier 1080 migrates into the contact liquid 1090 to form an interfacial region 1095. In some embodiments, the interfacial region 1095 can have a thickness at the surface of the contact liquid 1090 that is greater than about 1 nm, 5 nm, 10 nm, 25 nm, 50 nm, 75 nm, 100 nm, 200 nm, 300 nm, 400 nm, 500 nm, 600 nm, 700 nm, 800 nm, 900 nm, 1,000 nm, 2 μm, 5 μm, 10 μm, 15 μm, 20 μm, 25 μm, 30 μm, 35 μm, 40 μm, 45 μm, 50 μm, 55 μm, 60 μm, 65 μm, 70 μm, or greater. In some embodiments, the interfacial region 1095 can make up greater than about 1% of the thickness of the bulk product (e.g., contact liquid 1090) greater than about 2%, 3%, 4%, 5%, 10%, 15%, 20%, 25%, 30%, 35%, 40%, 45%, 50% or greater.

In some embodiments, the rheological modifier 1070 can be a plurality of particles added to the liquid 1060. In some embodiments, the rheological modifier 1070 can be a fluid material added to the liquid 1060. In some embodiments, the liquid 1060 can be selected from among materials that inherently have one or more desired rheological properties such that no rheological modifier 1070 is necessary. In some embodiments, the rheological modifier 1070 can be added to increase shear strength of the liquid 1060. In some embodiments, the rheological modifier 1070 can be added to increase the viscosity of the liquid 1060. In some embodiments, the rheological modifier 1070 can be added to increase the rate of retention of the liquid 1060 on the substrate 1010. In some embodiments, the rheological modifier 1070 can be added to In some embodiments, the rheological modifier 1070 can be in the form of particles having an average dimension of between about 1 nm and about 50 μm, between about 10 nm and about 45 μm, between about 25 nm and about 40 μm, between about 50 nm and about 35 μm, between about 100 nm and about 30 μm, between about 500 nm and about 29 μm, between about 750 nm and about 28 μm, between about 1 μm and about 27 μm, between about 2 μm and about 26 μm, between about 3 μm and about 25 μm, between about 4 μm and about 24 μm, between about 20 nm and about 30 μm, between about 20 nm and about 25 μm, between about 20 nm and about 20 μm, between about 20 nm and about 15 μm, between about 20 nm and about 10 μm, between about 20 nm and about 5 μm, between about 10 nm and about 4 μm, between about 10 nm and about 3 μm, between about 10 nm and about 2 μm, between about 10 nm and about 1 μm, between about 50 nm and about 10 μm, between about 50 nm and about 9 μm, between about 50 nm and about 8 μm, between about 50 nm and about 7 μm, between about 50 nm and about 6 μm, between about 50 nm and about 5 μm, between about 50 nm and about 4 μm, between about 50 nm and about 3 μm, between about 50 nm and about 2 μm, or between about 50 nm and about 1 μm, inclusive of all values and ranges therebetween. In some embodiments, the rheological modifier 1070 can be in the form of particles having an average dimension of less than about 50 μm, 45 μm, 40 μm, 35 μm, 30 μm, 29 μm, 28 μm, 27 μm, 26 μm, 25 μm, 24 μm, 23 μm, 22 μm, 21 μm, 20 μm, 19 μm, 18 μm, 17 μm, 16 μm, 15 μm, 14 μm, 13 μm, 12 μm, 11 μm, 10 μm, 9 μm, 8 μm, 7 μm, 6 μm, 5 μm, 4 μm, 3 μm, 2 μm, 1 μm, 750 nm, 500 nm, 250 nm, or 100 nm, inclusive of all values and ranges therebetween. In some embodiments, the rheological modifier 1070 can be in the form of particles having an average dimension of greater than about 10 nm, 25 nm, 50 nm, 75 nm, 100 nm, 250 nm, 500 nm, 750 nm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 45 μm, or 50 μm, inclusive of all values and ranges therebetween.

In some embodiments, the rheological modifier 1070 can be about 0.1 wt % to about 25 wt % of the durable lubricious surface 1000, about 0.5 wt %, to about 20 wt %, about 1 wt % to about 15 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 0.5 wt % to about 4 wt %, about 0.5 wt % to about 3 wt %, about 0.1 wt % to about 2 wt %, or about 0.1 wt % to about 1 wt %, inclusive of all values and ranges therebetween. In some embodiments, the rheological modifier 1070 can be less than about 25 wt %, less than about 20 wt %, less than about 15 wt %, less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, less than about 1 wt %, less than about 0.75 wt %, less than about 0.50 wt %, less than about 0.25 wt %, less than about 0.10 wt %, or less, inclusive of all values and ranges therebetween.

In some embodiments, the rheological modifier 1070 can include at least one of insoluble fibers, purified wood cellulose, micro-crystalline cellulose, oat bran fiber, wax, carnauba wax, Japan wax, beeswax, candelilla wax, fructo-oligosaccharides, a metal oxide, montan wax, lignite and peat, ozokerite, ceresins, bitumens, petrolatuns, paraffins, microcrystalline wax, lanolin, an ester of metal or alkali, flour of coconut, almond, potato, wheat, pulp, zein, dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, ferric oxide, ferrous oxide, silica, fumed silica, hydrophobic silica, hydrophilic silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether (PFPE), polychlorotetrafluoroethylene (PCTFE), polyvinyl alcohol (PVA), polyethyleneglycol (PEG), tecnoflon cellulose acetate, poly(acrylic acid), poly(propylene oxide), D-sorbitol, polycarbonate, a styrenic block copolymer, polystyrene-b-poly(ethylene/propylene), polystyrene-b-poly(ethylene/propylene)-b-polystyrene, polystyrene-b-poly(ethylene/butylene)-b-polystyrene, polystyrene-b-poly(ethylene-ethylene/propylene)-b-polystyrene, styrene-isoprene-styrene, a poly-olefin based thermoplastic elastomer, an ethylene-propylene random copolymer (EPM), a hydrogenated polybutadiene-isoprene-butadiene block copolymer, a polyamide based thermoplastic elastomer, polyesteramide (PEA), polyetheresteramide (PEEA), polycarbonate ester-amide (PCEA), polyether-block-amide (PE-b-A), a polyacrylate based thermoplastic elastomer, poly(MMA-b-tBA-MMA), poly(MMA-b-alkyl acrylate-MMA), a mineral oil, a paraffin oil, a C13-C14 isoparaffin, a C16-C18 isoparaffin, a diglyceride ester, a triglyceride ester, a tri alkyl ester of citric acid, a glycerol diester, a glycerol triester, an ester of myristate, an adipate, a sebacate, and combinations thereof.

A method of forming the durable lubricious surface 1000 can include disposing a composition (e.g., the lubricious surface coating) on the substrate 1010 to form the durable lubricious surface 1000. In some embodiments, the composition can including a liquid, a first plurality of particles, and a second plurality of particles. The composition can include any composition of the lubricious surface coating 1020 or any other composition described herein. By way of example only, the composition can include the liquid 1060, the plurality of particles 1040, the interfacial modifier 1080, and/or the theological modifier 1070. In some embodiments, the various materials comprising the composition can be mixed together to form the composition and the composition can be applied to the substrate 1010. In some embodiments, one or more of the materials comprising the composition can be mixed together to form an intermediate material, the intermediate material can be applied to the substrate 1010, and one or more of the remaining materials comprising the composition can be added to the intermediate material to form the composition. In some embodiments, each of the materials comprising the composition can be disposed to the substrate 1010 to collectively form the composition on the substrate. The method further includes disposing a contacting phase on the lubricious surface and allowing at least a portion of the second plurality of particles to migrate to the contacting phase. The contacting phase (i.e., contact liquid, contacting liquid, or product) can include any of the materials as described herein. In some embodiments, the durable lubricious surface 1000 can be formed by depositing the composition to the substrate 1010 to form a composition-coated substrate, depositing the contacting phase onto the composition-coated substrate to form the durable lubricious surface 1000, and allowing at least a portion of the composition to migrate into the contacting phase.

In some embodiments, the durable lubricious surface 1000 can have a first lubricity in the first configuration and a second lubricity in the second configuration. In some embodiments, the first lubricity can be less than the second lubricity. In some embodiments, the first lubricity can be less than about 99%, 95%, 90%, 80%, 70%, 60%, 50%, 40%, 30%, 20%, or 10% of the second lubricity.

While various embodiments have been described above, it should be understood that they have been presented by way of example only, and not limitation. Where schematics and/or embodiments described above indicate certain components arranged in certain orientations, positions, and/or configurations, the arrangement of components may be modified. Although various embodiments have been described as having particular features and/or combinations of components, other embodiments are possible having a combination of any features and/or components from any of embodiments as discussed above. For example, the rheological modifier additive 670 can be included in any of the embodiments described herein to modify the theology of the lubricious liquids.

The invention claimed is:

1. An article, comprising:
   a substrate,
   a liquid disposed on the substrate, the liquid having an average thickness and being immiscible with a contacting phase;
   a first plurality of particles disposed in the liquid and having an average dimension between about 5 µm and about 40 µm and configured to remain in the liquid during use; and
   a second plurality of particles disposed in the liquid and having an average dimension greater than about 20 µm and greater than the average thickness of the liquid and configured to migrate to the contacting phase during use, wherein the first plurality of particles are hydrophobic and the second plurality of particles are hydrophilic.

2. The article of claim 1, wherein the average thickness of the liquid is between about 5 µm and about 80 µm.

3. The article of claim 1, wherein the liquid remains liquid during use of the article.

4. The article of claim 1, wherein the liquid includes at least one of a silicone oil, a fluorinated hydrocarbon, a fluorinated perfluoropolyether, a hydrocarbon liquid, a vegetable oil, a vegetable oil derivative, a triglyceride, a fatty acid, an ester, and an FDA-approved liquid food additive.

5. The article of claim 1, wherein the contacting phase is at least one of a yield stress fluid, a non-Newtonian fluid, a Bingham plastic, and a thixotropic fluid.

6. The article of claim 5, wherein the contacting phase is at least one of toothpaste, a mouth cream, a denture fixing compound, sun screen, an antiperspirant, an anti-bacterial cleanser, a lotion, a condiment, shampoo, conditioner, a moisturizer, face wash, hair gel, a medical fluid, an anti-bacterial ointment, an anti-bacterial cream, laundry detergent, paint, caulk, a sealant, an adhesive, an agrochemical, an oil, a glue, a wax, a petroleum product, a fabric softener, an industrial solution, ketchup, catsup, mustard, mayonnaise, syrup, honey, jelly, peanut butter, butter, chocolate syrup, shortening, margarine, oleo, grease, dip, yogurt, sour cream, cosmetics, and combinations thereof.

7. The article of claim 1, wherein the first plurality of particles includes at least one of insoluble fibers, purified wood cellulose, micro-crystalline cellulose, oat bran fiber, wax, carnauba wax, Japan wax, beeswax, candelilla wax, fructo-oligosaccharides, a metal oxide, montan wax, lignite and peat, ozokerite, ceresins, bitumens, petrolatuns, paraffins, microcrystalline wax, lanolin, an ester of metal or alkali, flour of coconut, almond, potato, wheat, pulp, zein, dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, ferric oxide, ferrous oxide, silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether(PFPE), polychlorotetrafluoroethylene (PCTFE), polyvinyl alcohol (PVA), polyethyleneglycol (PEG), tecnoflon cellulose acetate, poly(acrylic acid), poly(propylene oxide), D-sorbitol, polycarbonate, a styrenic block copolymer, polystyrene-b-poly(ethylene/propylene), polystyrene-b-poly(ethylene/propylene)-b-polystyrene, polystyrene-b-poly(ethylene/butylene)-b-polystyrene, polystyrene-b-poly(ethylene-ethylene/propylene)-b-polystyrene, styrene-isoprene-styrene, a poly-olefin based thermoplastic elastomer, an ethylene-propylene random copolymer (EPM), a hydrogenated polybutadiene-isoprene-butadiene block copolymer, a polyamide based thermoplastic elastomer, polyesteramide (PEA), polyetheresteramide (PEEA), polycarbonate esteramide (PCEA), polyether-block-amide (PE-b-A), a polyacrylate based thermoplastic elastomer, poly(MMA-b-tBA-MMA), poly(MMA-b-alkyl acrylate-MMA), a mineral oil, a paraffin oil, a C13-C14 isoparaffin, a C16-C18 isoparaffin, a diglyceride ester, a triglyceride ester, a tri alkyl ester of citric acid, a glycerol diester, a glycerol triester, an ester of myristate, an adipate, a sebacate, and combinations thereof.

8. The article of claim 1, wherein the second plurality of particles have an average dimension between about 30 µm and about 80 µm.

9. The article of claim 1, wherein the second plurality of particles include a material that enables crosslinking by formation of at least one of hydrogen bonding and physical crosslinking.

10. The article of claim 9, wherein the second plurality of particles enable crosslinking between the second plurality of particles and a surface of the contacting phase.

11. The article of claim 1, wherein the second plurality of particles include at least one of a polysaccharide, a thermoplastic elastomer, a cross-linked polyacrylic acid, a waxy solid, and combinations thereof.

12. The article of claim 10, wherein the second plurality of particles include at least one of xanthan gum, guar gum, cellulose gum, chitin, styrene ethylene butylene styrene, sodium polyacrylate, polycarbophil, a carbomer, calcium polyacrylate, and combinations thereof.

13. The article of claim 1, further comprising:
a third plurality of particles, the third plurality of particles different than the first plurality of particles and the second plurality of particles.

14. The article of claim 13, wherein the third plurality of particles have an average dimension between about 20 nm and about 10 µm.

15. The article of claim 14, wherein the third plurality of particles have an average dimension between about 20 nm and about 3 µm.

16. The article of claim 15, wherein the third plurality of particles include at least one of insoluble fibers, purified wood cellulose, micro-crystalline cellulose, oat bran fiber, wax, carnauba wax, Japan wax, beeswax, candelilla wax, fructo-oligosaccharides, a metal oxide, montan wax, lignite and peat, ozokerite, ceresins, bitumens, petrolatuns, paraffins, microcrystalline wax, lanolin, an ester of metal or alkali, flour of coconut, almond, potato, wheat, pulp, zein, dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, ferric oxide, ferrous oxide, silica, hydrophobic silica, fumed silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, polystyrene, nylon, polypropylene, wax, polyethylene terephthalate, polypropylene, polyethylene, polyurethane, polysulphone, polyethersulfone, polytetrafluoroethylene (PTFE), tetrafluoroethylene (TFE), fluorinated ethylenepropylene copolymer (FEP), polyvinylidene fluoride (PVDF), perfluoroalkoxytetrafluoroethylene copolymer (PFA), perfluoromethyl vinylether copolymer (MFA), ethylenechlorotrifluoroethylene copolymer (ECTFE), ethylene-tetrafluoroethylene copolymer (ETFE), perfluoropolyether(PFPE), polychlorotetrafluoroethylene (PCTFE), polyvinyl alcohol (PVA), polyethyleneglycol (PEG), tecnoflon cellulose acetate, poly(acrylic acid), poly(propylene oxide), D-sorbitol, polycarbonate, a styrenic block copolymer, polystyrene-b-poly(ethylene/propylene), polystyrene-b-poly(ethylene/propylene)-b-polystyrene, polystyrene-b-poly(ethylene/butylene)-b-polystyrene, polystyrene-b-poly(ethylene-ethylene/propylene)-b-polystyrene, styrene-isoprene-styrene, a poly-olefin based thermoplastic elastomer, an ethylene-propylene random copolymer (EPM), a hydrogenated polybutadiene-isoprene-butadiene block copolymer, a polyamide based thermoplastic elastomer, polyesteramide (PEA), polyetheresteramide (PEEA), polycarbonate esteramide (PCEA), polyether-block-amide (PE-b-A), a polyacrylate based thermoplastic elastomer, poly(MMA-b-tBA-MMA), poly(MMA-b-alkyl acrylate-MMA), a mineral oil, a paraffin oil, a C13-C14 isoparaffin, a C16-C18 isoparaffin, a diglyceride ester, a triglyceride ester, a tri alkyl ester of citric acid, a glycerol diester, a glycerol triester, an ester of myristate, an adipate, a sebacate, and combinations thereof.

17. The article of claim 16, wherein the third plurality of particles are configured to modify the rheology of the liquid.

18. The article of claim 17, wherein the third plurality of particles are configured to increase the viscosity of the liquid.

19. The article of claim 1, wherein the second plurality of particles are configured to increase the yield stress of the contacting phase.

20. The article of claim 1, wherein the second plurality of particles are configured to increase the viscosity of the contacting phase.

21. An article, comprising:
a substrate,
a liquid disposed on the substrate, the liquid being immiscible with a contacting phase;
about 1 wt % to about 20 wt % of a first plurality of particles disposed in the liquid, wherein the first plurality of particles are hydrophobic and are configured to remain in the liquid during use of the article; and
about 1 wt % to about 50 wt % of a second plurality of particles disposed in the liquid, wherein the second plurality of particles are hydrophilic and are configured to migrate to the contacting phase during use of the article.

22. The article of claim 21, wherein the second plurality of particles are configured to increase the yield stress of the contacting phase.

23. The article of claim 21, wherein the first plurality of particles have an average dimension, the liquid disposed on the substrate has an average thickness, and the average dimension of the first plurality of particles is less than 1.5 times the average thickness of the liquid.

24. The article of claim 23, wherein the average thickness of the liquid is between about 5 µm and about 80 µm.

25. The article of claim 24, wherein the average thickness of the liquid is between about 10 µm and about 50 µm.

26. The article of claim 21, wherein the second plurality of particles include at least one of xanthan gum, guar gum, cellulose gum, chitin, styrene ethylene butylene styrene, sodium polyacrylate, polycarbophil, a carbomer, calcium polyacrylate, and combinations thereof.

27. The article of claim 21, further comprising:
about 0.1 wt % to about 50 wt % of a third plurality of particles disposed in the liquid, the third plurality of particles configured to modify the rheology of the liquid.

28. The article of claim 27, wherein about 1 wt % to about 20 wt % of the third plurality of particles are disposed in the liquid.

29. The article of claim 27, wherein the third plurality of particles include at least one of a clay mineral, bentonite, palygorskite, kaolinite, silica, hydrophilic silica, fumed silica, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, and combinations thereof.

30. The article of claim 21, wherein the substrate includes at least one of a flat surface, a contoured surface, an inner surface, a bumpy surface, a smooth surface, a surface textured with regular periodic patters, a surface textured with random shapes and contours, or combinations thereof.

31. The article of claim 21, wherein the substrate is a surface of at least one of a tube, a bottle, a vial, a flask, a mold, a jar, a tub, a cup, a cap, a glass, a pitcher, a barrel, a bin, a tote, a tank, a keg, a tub, a syringe, a tin, a pouch, a lined box, a hose, a cylinder, a can, a hose, a pipe, a conduit, a nozzle, a syringe needle, a dispensing tip, a lid, a pump, and combinations thereof.

32. An article, comprising:
a substrate,
a lubricious surface including a liquid, a first plurality of particles, and a second plurality of particles, the second plurality of particles having different water miscibility properties than the first plurality of particles, the lubricous surface disposed on the substrate and configured to be placed in contact with a contacting phase,
wherein the lubricious surface has a first configuration prior to contacting the contacting phase, and a second configuration at a time period after contacting the contacting phase,
wherein all or substantially all of the first plurality of particles remain in the liquid in the second configuration,
wherein at least a portion of the second plurality of particles migrates to the contacting phase in the second configuration.

33. The article of claim 32, wherein the lubricious surface has a first lubricity in the first configuration and a second lubricity in the second configuration, the second lubricity being greater than the first lubricity.

34. The article of claim 32, wherein the second plurality of particles are configured to modify the rheology of the contacting phase.

35. The article of claim 34, wherein the second plurality of particles are configured to increase the viscosity of the contacting phase.

36. The article of claim 32, wherein the second plurality of particles have an average dimension, the liquid has an average thickness on the substrate, and the average dimension of the second plurality of particles is greater than about the average thickness of the liquid.

37. The article of claim 32, wherein the first plurality of particles have an average dimension, the liquid has an average thickness on the substrate, and the average dimension of the first plurality of particles is less than about 1.5 times the average thickness of the liquid.

38. The article of claim 37, wherein the average thickness of the liquid is between about 5 µm and about 80 µm.

39. The article of claim 38, wherein the average thickness of the liquid is between about 10 µm and about 50 µm.

40. The article of claim 32, wherein the first plurality of particles are hydrophobic.

41. The article of claim 40, wherein the second plurality of particles are hydrophilic.

42. The article of claim 32, wherein the first plurality of particles include at least one of xanthan gum, guar gum, cellulose gum, chitin, styrene ethylene butylene styrene, sodium polyacrylate, polycarbophil, a carbomer, calcium polyacrylate, and combinations thereof.

43. The article of claim 32, wherein the lubricious surface further comprises a third plurality of particles disposed in the liquid, the third plurality of particles configured to modify the rheology of the liquid.

44. The article of claim 43, wherein about 1 wt % to about 50 wt % of the third plurality of particles are disposed in the liquid.

45. The article of claim 43, wherein the third plurality of particles include at least one of silica, hydrophilic silica, fumed silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, and combinations thereof.

46. The article of claim 32, wherein the time period is less than about 1 week.

47. The article of claim 46, wherein the time period is less than about 1 day.

48. The article of claim 47, wherein the time period is less than about 1 hour.

49. The article of claim 32, wherein substantially all of the second plurality of particles migrate into the contacting phase after about 90 minutes.

50. The article of claim 32, wherein the liquid is immiscible with the contacting phase.

51. The article of claim 32, wherein the liquid remains liquid during use of the article.

52. The article of claim 51, wherein the liquid remains liquid during more than one month of use of the article.

53. The article of claim 52, wherein the liquid remains liquid during more than one year of use of the article.

54. The article of claim 53, wherein the liquid remains liquid during more than three years of use of the article.

55. An article, comprising:
a substrate,
a liquid disposed on the substrate, the liquid being immiscible with a contacting phase;
a plurality of hydrophobic particles disposed in the liquid and having an average dimension between about 5 µm and about 40 µm;

a plurality of hydrophilic particles disposed in the liquid and having an average dimension greater than about 20 μm, the hydrophilic particles configured to migrate to the contacting phase; and a third plurality of particles configured to modify the rheology of the liquid.

56. The article of claim 55, wherein the third plurality of particles have an average dimension less than about 3 μm.

57. An article, comprising:
a substrate,
a liquid disposed on the substrate, the liquid being immiscible with a contacting phase;
a first plurality of particles disposed in the liquid and having an average dimension between about 5 μm and about 40 μm, the first plurality of particles configured to remain in the liquid during use of the article; and
a second plurality of particles disposed in the liquid and having an average dimension greater than about 20 μm, the second plurality of particles configured to migrate into the contacting phase during use of the article
wherein the first plurality of particles are hydrophobic.

58. The article of claim 57, wherein the second plurality of particles have an average dimension, the liquid disposed on the substrate has an average thickness, and the average dimension of the second plurality of particles is greater than the average thickness of the liquid.

59. The article of claim 57, wherein the liquid includes at least one of a silicone oil, a fluorinated hydrocarbon, a fluorinated perfluoropolyether, a hydrocarbon liquid, a vegetable oil, a vegetable oil derivative, a triglyceride, a fatty acid, an ester, and an FDA-approved liquid food additive.

60. The article of claim 57, wherein the contacting phase is at least one of a yield stress fluid, a non-Newtonian fluid, a Bingham plastic, and a thixotropic fluid.

61. The article of claim 57, wherein the second plurality of particles are hydrophilic.

62. The article of claim 57, wherein the second plurality of particles include a material that enables crosslinking by formation of at least one of hydrogen bonding and physical crosslinking.

63. The article of claim 62, wherein the second plurality of particles enable crosslinking between the second plurality of particles and a surface of the contacting phase.

64. The article of claim 57, wherein the second plurality of particles include at least one of a polysaccharide, a thermoplastic elastomer, a cross-linked polyacrylic acid, a waxy solid, and combinations thereof.

65. The article of claim 64, wherein the second plurality of particles include at least one of xanthan gum, guar gum, cellulose gum, chitin, styrene ethylene butylene styrene, sodium polyacrylate, polycarbophil, a carbomer, calcium polyacrylate, and combinations thereof.

66. The article of claim 57, further comprising:
a third plurality of particles, the third plurality of particles different than the first plurality of particles and the second plurality of particles.

67. The article of claim 66, wherein the third plurality of particles has an average dimension between about 20 nm and about 10 μm.

68. The article of claim 67, wherein the third plurality of particles has an average dimension between about 20 nm and about 3 μm.

69. The article of claim 66, wherein the third plurality of particles are configured to modify the rheology of the liquid.

70. The article of claim 66, wherein the third plurality of particles are configured to increase the viscosity of the liquid.

71. The article of claim 57, wherein the second plurality of particles are configured to increase the yield stress of the contacting phase.

72. The article of claim 57, wherein the second plurality of particles are configured to increase the viscosity of the contacting phase.

73. An article, comprising:
a substrate,
a liquid disposed on the substrate;
a plurality of hydrophobic particles disposed in the liquid and configured to remain in the liquid; and
a plurality of hydrophilic particles disposed in the liquid and configured to migrate into a contacting phase.

74. The article of claim 73, wherein the liquid is immiscible with the contacting phase.

75. The article of claim 73, wherein the plurality of hydrophilic particles are configured to increase the yield stress of the contacting phase.

76. The article of claim 73, wherein the plurality of hydrophilic particles are configured to increase the viscosity of the contacting phase.

77. The article of claim 73, wherein the plurality of hydrophobic particles have an average thickness, the liquid disposed on the substrate has an average thickness, and the average dimension of the plurality of hydrophobic particles is less than about 1.5 times the average thickness of the liquid.

78. The article of claim 73, wherein the plurality of hydrophilic particles have an average thickness, the liquid disposed on the substrate has an average thickness, and the average dimension of the plurality of hydrophilic particles is greater than about the average thickness of the liquid.

79. The article of claim 78, wherein the average thickness of the liquid is between about 5 μm and about 80 μm.

80. The article of claim 78, wherein the average thickness of the liquid is between about 10 μm and about 50 μm.

81. The article of claim 73, wherein the liquid remains liquid during use of the article.

82. The article of claim 73, wherein the liquid includes at least one of a silicone oil, a fluorinated hydrocarbon, a fluorinated perfluoropolyether, a hydrocarbon liquid, a vegetable oil, a vegetable oil derivative, a triglyceride, a fatty acid, an ester, and an FDA-approved liquid food additive.

83. The article of claim 73, wherein the plurality of hydrophobic particles have an average dimension between about 0.5 μm and about 40 μm.

84. The article of claim 83, wherein the plurality of hydrophobic particles have an average dimension between about 5 μm and about 30 μm.

85. The article of claim 73, wherein the plurality of hydrophilic particles have an average dimension greater than about 20 μm.

86. The article of claim 85, wherein the plurality of hydrophilic particles have an average dimension between about 30 μm and about 80 μm.

87. The article of claim 73, wherein the plurality of hydrophilic particles includes at least one of a polysaccharide, a thermoplastic elastomer, a cross-linked polyacrylic acid, a waxy solid, xanthan gum, guar gum, cellulose gum, chitin, styrene ethylene butylene styrene, sodium polyacrylate, polycarbophil, a carbomer, calcium polyacrylate, and combinations thereof.

88. The article of claim 73, further comprising:
a rheological modifier disposed in the liquid and configured to modify the rheology of the liquid.

89. The article of claim 88, wherein the rheological modifier includes at least one of silica, hydrophilic silica, fumed silica, a clay mineral, bentonite, palygorskite, kaolinite, vermiculite, apatite, graphite, molybdenum disulfide, mica, boron nitride, sodium formate, sodium oleate, sodium palmitate, sodium sulfate, sodium alginate, agar, gelatin, pectin, gluten, starch alginate, carrageenan, whey, and combinations thereof.

90. The article of claim 73, wherein at least one of the plurality of hydrophobic particles and the plurality of hydrophilic particles is an interfacial modifier.

91. The article of claim 90, wherein a partition coefficient of the interfacial modifier with the liquid is less than about 1.

92. The article of claim 91, wherein the partition coefficient is less than about 0.1.

93. An article, comprising:
a substrate,
a liquid disposed on the substrate;
a plurality of hydrophobic particles disposed in the liquid; and
a plurality of hydrophilic particles disposed in the liquid and configured to migrate to a contacting phase,
wherein at least one of the plurality of hydrophobic particles and the plurality of hydrophilic particles is an interfacial modifier having a partition coefficient with the liquid less than about 1.

94. An article, comprising:
a substrate,
a liquid disposed on the substrate, the liquid being immiscible with a contacting phase;
about 1 wt % to about 20 wt % of a first plurality of particles disposed in the liquid, the first plurality configured to remain in the liquid during use of the article; and
about 1 wt % to about 50 wt % of a second plurality of particles disposed in the liquid, the second plurality of particles including at least one of xanthan gum, guar gum, cellulose gum, chitin, styrene ethylene butylene styrene, sodium polyacrylate, polycarbophil, a carbomer, calcium polyacrylate, and combinations thereof, and the second plurality of particles configured to migrate to the contacting phase.

* * * * *